United States Patent
da Silva et al.

(10) Patent No.: US 10,506,494 B2
(45) Date of Patent: Dec. 10, 2019

(54) CONTROLLING ACCESS TO A WIRELESS COMMUNICATION NETWORK

(71) Applicant: Telefonaktiebolaget LM Ericsson (publ), Stockholm (SE)

(72) Inventors: Icaro L. J. da Silva, Solna (SE); Erik Eriksson, Linköping (SE); Pål Frenger, Linköping (SE); Gunnar Mildh, Sollentuna (SE); Torgny Palenius, Barsebäck (SE); Jose Luis Pradas, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/757,234

(22) PCT Filed: Sep. 4, 2015

(86) PCT No.: PCT/EP2015/070235
§ 371 (c)(1),
(2) Date: Mar. 2, 2018

(87) PCT Pub. No.: WO2017/036552
PCT Pub. Date: Mar. 9, 2017

(65) Prior Publication Data
US 2018/0279203 A1    Sep. 27, 2018

(51) Int. Cl.
*H04W 48/02* (2009.01)
*H04W 48/16* (2009.01)
(Continued)

(52) U.S. Cl.
CPC .......... *H04W 48/02* (2013.01); *H04W 4/70* (2018.02); *H04W 48/10* (2013.01); *H04W 48/16* (2013.01);
(Continued)

(58) Field of Classification Search
CPC .................................................. H04W 48/02
See application file for complete search history.

(56) References Cited

U.S. PATENT DOCUMENTS

2004/0203693 A1   10/2004   Quinn et al.
2006/0236083 A1   10/2006   Fritsch et al.
(Continued)

FOREIGN PATENT DOCUMENTS

EP   2373072 A1   10/2011
EP   2903349 A1    8/2015
(Continued)

OTHER PUBLICATIONS

Frenger, Pål et al., "A Clean Slate Radio Network Designed for Maximum Energy Performance", 2014 IEEE 25th Annual International Symposium on Personal, Indoor, and Mobile Radio Communication (PIMRC), Sep. 2, 2014, 1300-1304.
(Continued)

*Primary Examiner* — Samina F Choudhry
(74) *Attorney, Agent, or Firm* — Sage Patent Group

(57) ABSTRACT

A method for controlling access to a wireless communication network (102), the method comprising:
  a wireless communication device (101) receiving a parameter of a system configuration (MIB, SIB1, AIT-1, AIT-2) for accessing to the wireless communication network,
  the wireless communication device (101) receiving (S2) an indication (102) from the wireless communication network (102), the indication indicating whether an access attempt to the wireless communication network (102) is allowed using the parameter of the system configuration with a validity of the system configuration being undetermined,
  the wireless communication device (102) performing (S4) an access attempt to the wireless communication net-
(Continued)

work (102), if the indication indicates whether an access attempt to the wireless communication network (102) is allowed using the parameter of the system configuration (MIB, SIB1, AIT-1, AIT-2) with a validity of the system configuration being undetermined.

15 Claims, 16 Drawing Sheets

(51) Int. Cl.
  *H04W 4/70* (2018.01)
  *H04W 48/10* (2009.01)
  *H04W 72/04* (2009.01)
  *H04W 72/08* (2009.01)
  *H04W 48/12* (2009.01)
  *H04W 48/20* (2009.01)

(52) U.S. Cl.
  CPC ....... *H04W 72/048* (2013.01); *H04W 72/085* (2013.01); *H04W 48/12* (2013.01); *H04W 48/20* (2013.01)

(56) References Cited

U.S. PATENT DOCUMENTS

| | | | |
|---|---|---|---|
| 2010/0183031 A1* | 7/2010 | Dalsgaard | H04W 28/06 370/474 |
| 2012/0276933 A1 | 11/2012 | Laitinen | |
| 2013/0195003 A1* | 8/2013 | Lee | H04W 48/10 370/312 |
| 2014/0064158 A1 | 3/2014 | Timus | |
| 2014/0329503 A1 | 11/2014 | Deng | |
| 2015/0312823 A1 | 10/2015 | Li et al. | |
| 2015/0327155 A1* | 11/2015 | Lee | H04W 76/14 370/329 |
| 2015/0341848 A1 | 11/2015 | Song et al. | |
| 2016/0043849 A1* | 2/2016 | Lee | H04L 5/0053 370/329 |
| 2016/0269988 A1 | 9/2016 | Li et al. | |
| 2016/0309518 A1 | 10/2016 | Patel et al. | |
| 2016/0378454 A1 | 12/2016 | Nekrestyanov et al. | |
| 2018/0288679 A1 | 10/2018 | Hessler et al. | |

FOREIGN PATENT DOCUMENTS

| | | |
|---|---|---|
| WO | 2009004012 A1 | 1/2009 |
| WO | 2011100707 A1 | 8/2011 |
| WO | 2013183966 A1 | 12/2013 |

OTHER PUBLICATIONS

Unknown, Author, "5G—Key Component of the Networked Society", RWS-150009, 3GPP RAN Workshop on 5G, Phoenix, Arizona, USA, Sep. 17-18, 2015, pp. 1-55.

Unknown, Author, "Correction to detection of system information change by UE", 3GPP TSG-WG2 Meeting #74, R2-113227, Barcelona, Spain, May 9-13, 2011, 1-3.

Unknown, Author, "Small correction to SI81 provisioning via dedicated signalling", 3GPP TSG-RAN WG2 Meeting #81, R2-130441, St. Julian's, Malta, Jan. 28-Feb. 1, 2013, 1-6.

Unknown, Author, "System information acquisition for low complexity and coverage enhanced UEs", 3GPP TSG-RAN WG2 #89, Tdoc R2-150454, Ericsson, Feb. 9-13, 2015, 1-8.

* cited by examiner

CONTROLLING ACCESS TO A WIRELESS COMMUNICATION NETWORK

TECHNICAL FIELD

The present invention relates to wireless communications and, in particular, but not exclusively, the invention relates to a method for controlling access of at least one wireless communication device to a wireless communication network, a method performed by a wireless communication device, a method performed by at least one network node of a wireless communication network, a wireless communication device, an network node of a wireless communication network, a communication system, as well as respective computer program products.

BACKGROUND

Long Term Evolution (LTE) is a variant of a 3GPP (Third Generation Partnership Project) radio access technology where the radio base station nodes are connected to a core network, via Access Gateways (AGWs), rather than to radio network controller (RNC) nodes as in UTRAN (Universal Terrestrial Radio Access Network). In general, in LTE systems the functions of a radio network controller (RNC) node are distributed between the AGWs and the system's radio base stations nodes, referred to in the specifications for LTE as eNodeBs or eNBs. Generally, a wireless communication network can simultaneously support communication for multiple wireless communication devices, also referred to in the state of the art as terminal or as user equipment (UE). Each wireless communication device communicates with one or more access nodes such as a base station, e.g. a Node B or an Enhanced Node B (EnodeBs or eNB), via a downlink (from the access node to the wireless communication device) or uplink (from the wireless communication device to the access node) transmission. These communication links may be established via a single-input-single-output (SISO), single-input-multiple output (SIMO), multiple-input-single-output (MISO), or multiple-input-multiple-output (MIMO) system.

Wireless communication devices, such as UEs, are often handed-off between base stations and/or associated cells, for example, when a wireless communication device is moving relative to the base stations, or based on other considerations such as base station type, interference, loading or other criteria. In order to provide continuous service, handover procedures are used to effect transfers of wireless communication devices between base stations. However, a change of cells or base stations may also occur when the wireless communication device has been switched off and is powered on again in a coverage area of another base station or after a sleep phase or similar circumstances.

In order to access the wireless network via an access node, e.g. after powering on the device, when waking up from a sleep mode, or when changing cells the device typically goes through the following process: Since there are many frequencies, e.g. from different operators, available to which a wireless communication device may connect, the wireless communication device synchronizes to each frequency and checks whether this frequency is from the right operator to which it wants to connect to. This is done by going through a synchronization process. Once synchronized the wireless communication device reads the master information block (MIB) and System information blocks (SIB). The wireless communication device then proceeds by reading System information block 1 (SIB1) and System information block 2 (SIB2). This access information, i.e. MIB and SIB1, is transmitted by the network at a fixed cycles. For instance, MIB is transmitted every 4 frames starting from System Frame Number (SFN) SFN 0 and SIB1 is also transmitted every 8 frames starting from SFN 0. All other SIB are being transmitted at the cycles specified by SIB scheduling information elements contained in SIB1. MIB, SIB1 and all other SIB contain useful information for accessing the network. The information contained in MIB, SIB1 etc. may comprise or is related to downlink cell bandwidth, RACH parameters, IDLE mode paging configuration, such as timer and counter settings, and the like. In the next step, known as Random Access Procedure (RACH), the network for the first time knows that some wireless communication device is trying to get access.

Yet another use case for wireless communicating devices is for industrial applications. Wireless communication may be used for remote control of heavy machinery in remote or hazardous places; or used for monitoring and control of smart grids. Here the need has arisen to provide extremely fast and reliable connectivity, and thus obtain the functionality needed for these applications. Especially in the case of this machine type communication (MTC) short transmission time interval (TTI), robust transmission, fast channel assignment and in general high availability, energy efficiency and low latency are desirable.

SUMMARY

It is an object of the invention to reduce the complexity of signaling and signaling overhead for accessing the network. It is thus a further object of the present invention to optimize power consumption of a wireless communication network and/or a wireless communication device and—in case of a battery powered device—battery lifetime. Especially in the case of a hand-off between cells and/or when access information necessary to access a network has changed it is an object to optimize network access and/or re-entering the network. In particular in the framework of machine-type communication (MTC) it is an object of the invention to reduce the complexity of machine-type devices, minimize signaling overhead of the network and/or the wireless communication device and extend—in case of battery powered machine type devices—their battery lifetime even further.

According to a first aspect a method for controlling access to a wireless communication network is provided. The method comprises a wireless communication device receiving a parameter of a system configuration for accessing to the wireless communication network. The method further comprises the wireless communication device receiving an indication from the wireless communication network, the indication indicating whether an access attempt to the wireless communication network is allowed using the parameter of the system configuration with a validity of the system configuration being undetermined. The method further comprises the wireless communication device performing an access attempt to the wireless communication network, if the indication indicates whether an access attempt to the wireless communication network is allowed using the parameter of the system configuration with a validity of the system configuration being undetermined.

According to a second aspect a method for controlling access to a wireless communication network is provided. The method comprises a network node of the wireless communication network sending to a wireless communication device an indication, an indication indicating to a wireless communication device whether an access attempt to the network node is allowed using a parameter of a system configuration present in the wireless communication device with a validity of the system configuration being undetermined.

According to a third aspect a wireless communication device is provided. The wireless communication device being adapted to receive a parameter of a system configuration for accessing to the wireless communication network. The wireless communication device further being adapted to receive an indication from the wireless communication network, the indication indicating whether an access attempt to the wireless communication network is allowed using the parameter of the system configuration with a validity of the system configuration being undetermined. The wireless communication device further being adapted to perform an access attempt to the wireless communication network, if the indication indicates whether an access attempt to the wireless communication network is allowed using the parameter of the system configuration with a validity of the system configuration being undetermined.

According to a fourth aspect a network node of a wireless communication network is provided. The network node being adapted to send to the wireless communication device an indication, the indication indicating to a wireless communication device whether an access attempt to the network node is allowed using a parameter of a system configuration present in the wireless communication device with a validity of the system configuration being undetermined.

According to a fifth aspect a computer program product is provided. The computer program product comprises program code to be executed by a processor of a wireless communication device, thereby configuring the wireless communication device to operate in accordance with the method as defined by the first aspect.

According to a sixth aspect a computer program product is provided. The computer program product comprises program code to be executed by a processor of a network node of a wireless communication network, thereby configuring the network node to operate in accordance with a method as defined by the second aspect.

According to an seventh aspect a communication system is provided. The system comprising a first network node according to the fourth aspect and a wireless communication device according to third aspect and optionally a second network node according to the fourth aspect.

Further objects and features of the embodiments of the present invention will become apparent from the following detailed description in conjunction with the accompanying drawings. The following drawings are illustrative only, and various modifications and changes may be made in the specific embodiments illustrated as described within the scope of the appended claims.

DETAILED DESCRIPTION

Figure 1:
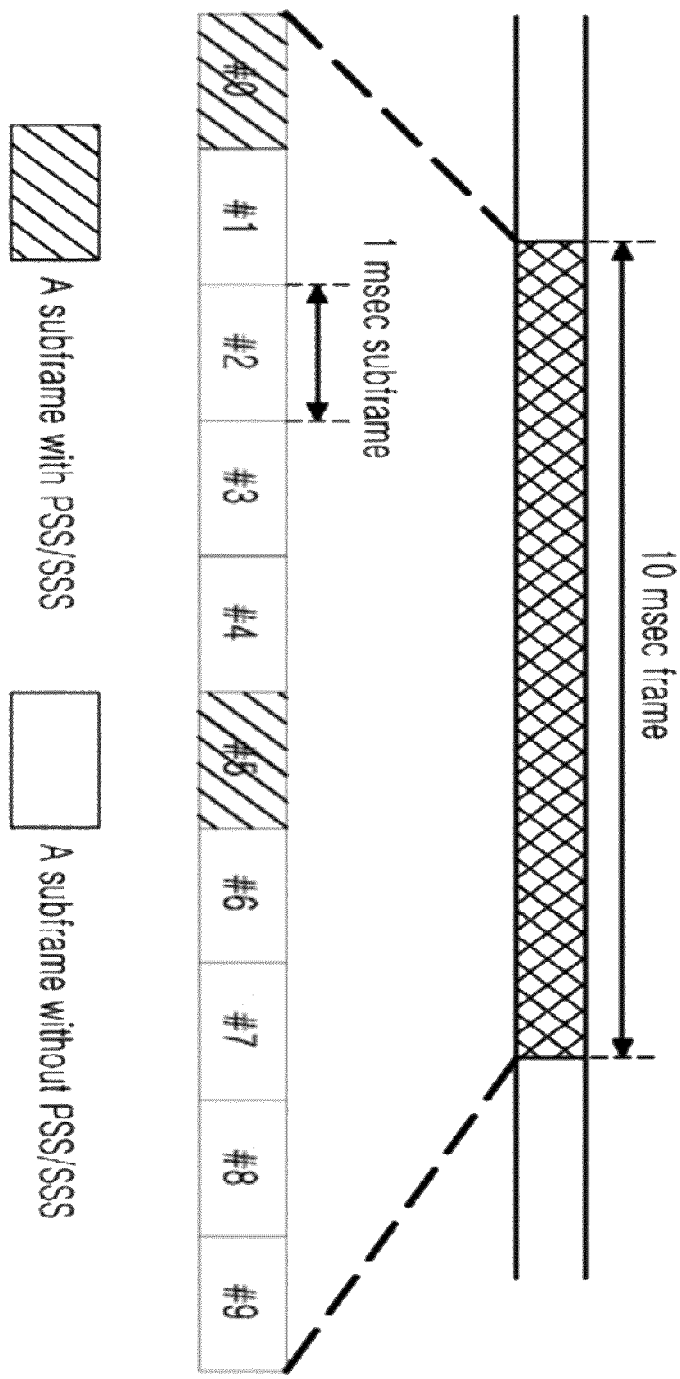
FIG. 1 illustrates a synchronization symbol frame and slot structure.

FIG. 1 illustrates a synchronization symbol frame and subframe structure. In FIG. 1 an exemplary primary synchronization signal (PSS) and secondary synchronization signal (SSS) frame and subframe structure in the time domain in the case of frequency division duplex (FDD) are shown.

Figure 11:
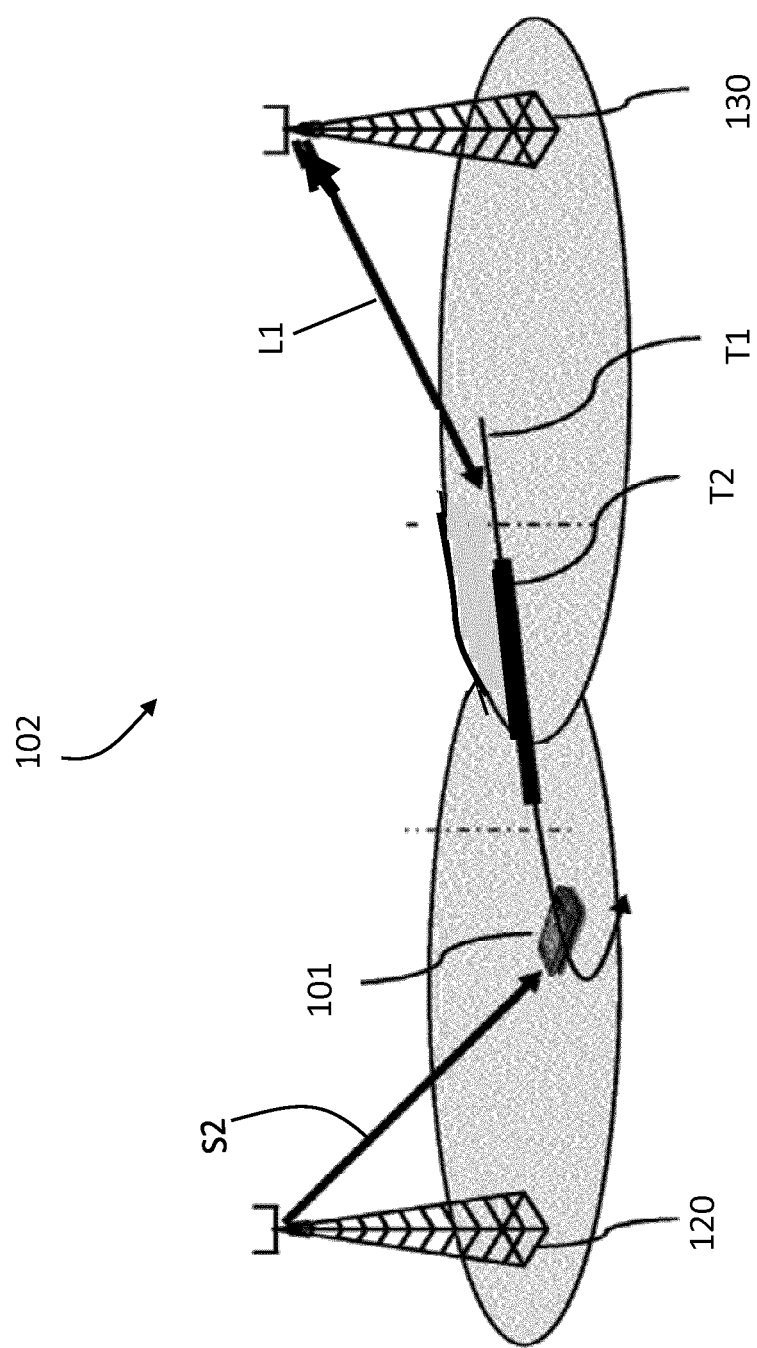
FIG. 11 shows illustration of an embodiment for controlling access to a wireless communication network.
Figure 12:
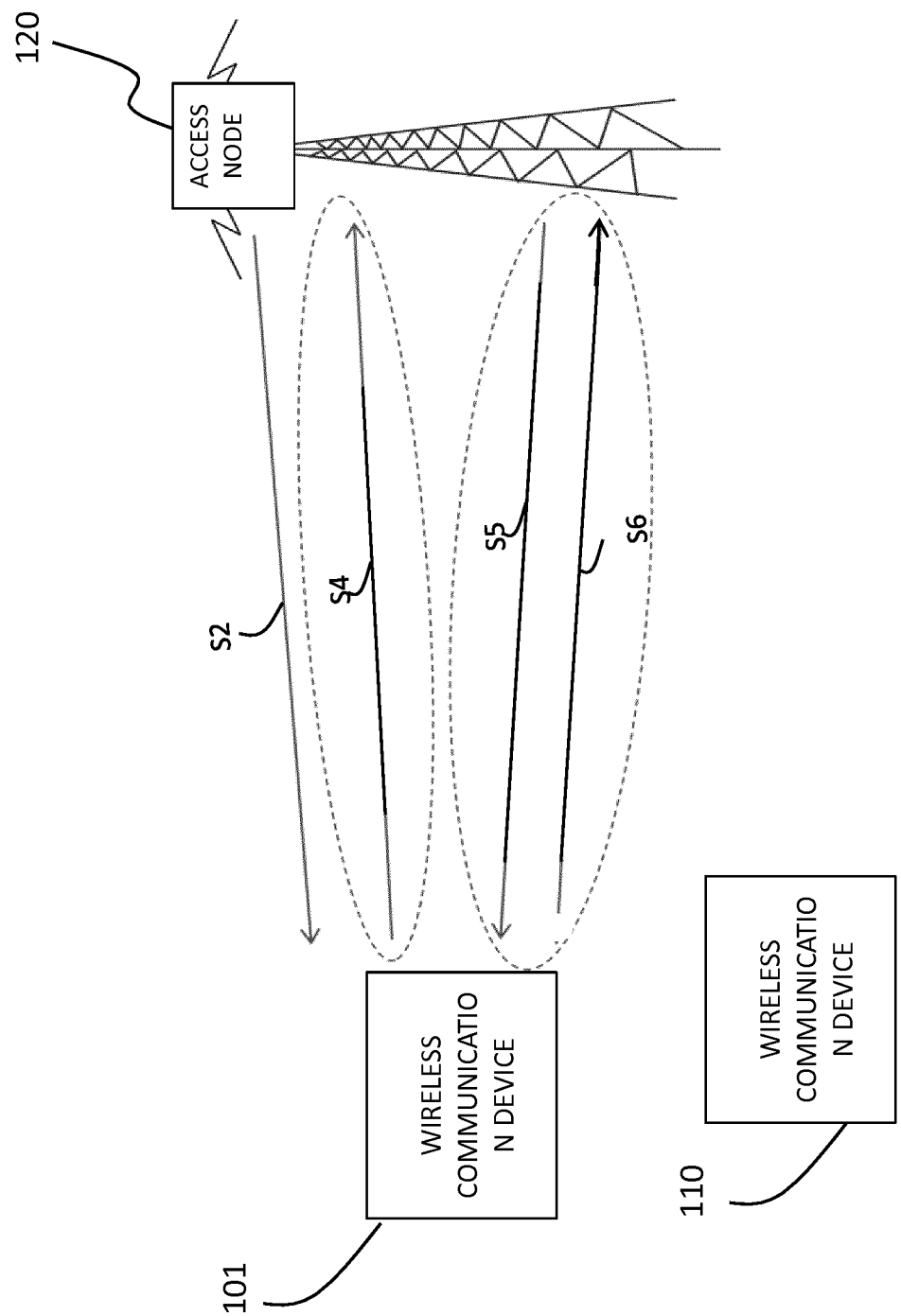
FIG. 12 shows another illustration of an embodiment for controlling access to a wireless communication network.

In a wireless communication network 102, such as a cellular network, wireless communication devices 101, 110 communicate e.g. via a Radio Access Network (RAN) to one or more core networks (CNs), for example as depicted in FIGS. 11 and 12.

Wireless communication devices 101, 110 are enabled to communicate wirelessly in the network 102. The communication may be performed e.g. between two wireless communication devices, between a wireless communication device and a regular telephone and/or between the wireless communication device and a network node, between a wireless communication device and a server via the RAN and possibly one or more core networks, comprised within the network.

The network 102 may cover a geographical area which is divided into cell areas. Each cell area may be served by a network node, such as an access node 120, 130, e.g. a base station, such as a Radio Base Station (RBS), which sometimes may be referred to as e.g. "eNB", "eNodeB", "NodeB", "B node", or BTS (Base Transceiver Station), depending on the technology and terminology used.

The access nodes 120, 130 may be of different classes such as e.g. macro eNodeB, home eNodeB or pico base station, based on transmission power and thereby also on cell size.

A cell is the geographical area where radio coverage is provided by an access node 120, 130 at an access node site.

One access node, situated on the access node site, may serve one or several cells. Further, each access node may support one or several communication technologies. The access nodes 120, 130 may communicate over an air interface operating on radio frequencies with the wireless communication devices within range of the access nodes.

In order to access a wireless communication network 102 a wireless communication device 101 has to acquire access information. Access information in particular comprises one or more parameters of a system configuration. The system configuration pertains to the wireless communication network and may comprise one or more parameters and/or parameter values by way of which the wireless communication network is configured to operate. Specific examples of such access information and system configuration are given further below.

A wireless communication device 101 may be any device intended for accessing services via a wireless communication network and configured to communicate over the wireless communication network 102. For instance, the wireless communication device 101 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device may be a portable, pocket-storable, hand-held, computer-comprised, or vehicle-mounted mobile device, enabled to communicate voice and/or data, via a wireless or wireline connection.

In the case of LTE these access information are called system information (SI). In LTE the system information may be obtained in different ways depending on whether the wireless communication device 101 is roaming, recovering from radio link failure (RLF) or powering on, however, some general steps are typically similar.

For accessing the network 102 the wireless communication network 102 broadcasts a certain amount of access information in each cell, e.g. via a network node, for example access node. The first is the so-called primary synchronization signal (PSS) and secondary synchronization signal (SSS) used by the wireless communication device 101 to obtain frequency and time (symbol and frame) synchronization. These sequences also encode the physical cell identity (PCI). After the physical layer synchronization and PCI detection the wireless communication device 101 is capable of performing channel estimation using the constantly broadcasted cell specific reference signals (C-RSs) and, consequently, is finally able to decode the access information as will be shown later. The PSS and SSS are respectively transmitted in the first and sixth subframes #3, #6 within a radio frame, and within each of these subframes in the fifth and sixth OFDM symbols, as shown in FIG. 1.

PSS and SSS occupy the six central resource blocks (RB) in the central band for a given carrier frequency. In summary: from a physical layer point of view, PSS/SSS and C-RSs are always broadcasted by the network. These are used by the wireless communication device 101 to synchronize and be able to perform channel estimation.

The access information, also called system information (SI) in LTE, is broadcasted by an access node 120, 130, such as an eNB or the like, over a logical channel Broadcast Control Channel (BCCH). This logical channel information is further carried over transport channel Broadcast Control Channel (BCH), or carried by a Downlink Shared Channel (DL-SCH).

Figure 2:
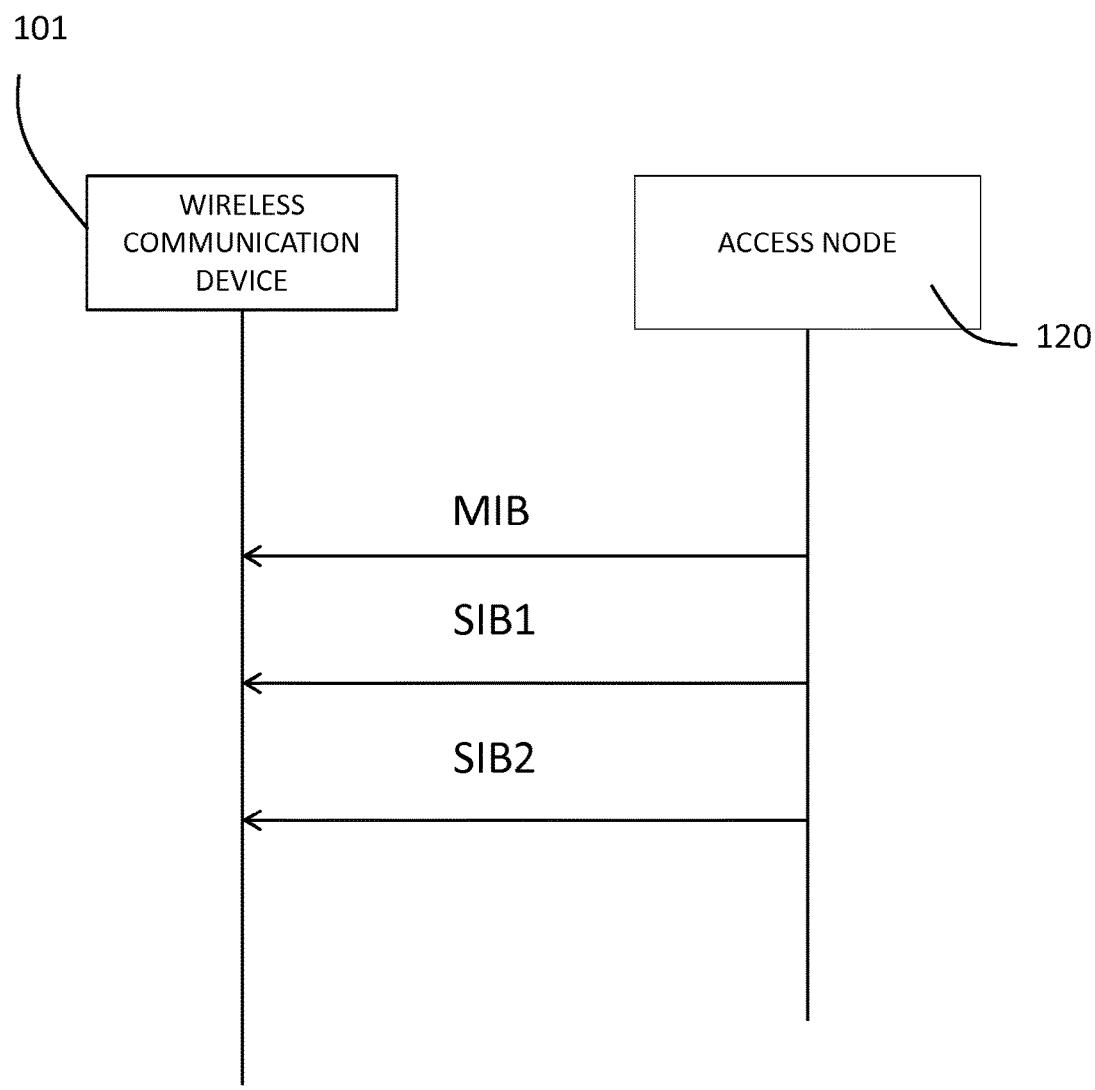
FIG. 2 illustrates the transmission of parameters of a system configuration.

Typically there are two system information parts, i.e. the static part and the dynamic part, which are transmitted from an access node 120 of a wireless communication network 102 to a wireless communication device 101 as shown in FIG. 2. The static part is called Master Information Block (MIB) and is transmitted using BCH and carried by Physical Broadcast Control Channel (PBCH) once every 40 ms. MIB carries useful information which includes channel bandwidth, Physical Hybrid ARQ Indicator Channel (PHICH) configuration details; transmit power, no. of antennas and SIB scheduling information transmitted along with other information on the DL-SCH.

The dynamic part is called as SIB and is mapped on system information blocks over DL-SCH and transmitted using Physical Downlink Shared Channel (PDSCH) at periodic intervals. SIB1 transmitted every 80 ms, SIB2 every 160 ms and SIB3 every 320 ms.

Figure 3:
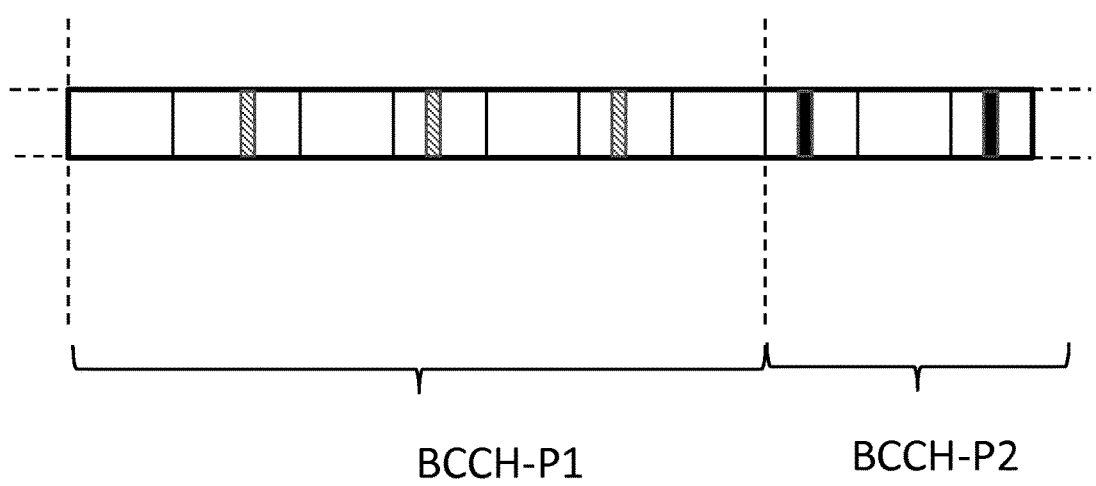
FIG. 3 illustrates a control concept for scheduling of parameters of a system configuration in the case system configuration has changed.

System information may change every BCCH modification period, i.e. BCCH-P1 and BCCH-P2 as shown in FIG. 3.

System information (SI) in LTE is structured as mentioned above by means of System Information Blocks (SIBs), each of which contains a set of functionally-related parameters. The SIB types that have been defined include:

The Master Information Block (MIB), which includes a limited number of the most frequently transmitted parameters which are essential for initial access to the network.

System Information Block Type 1 (SIB1), which contains parameters needed to determine if a cell is suitable for cell selection, as well as information about the time-domain scheduling of the other SIBs.

System Information Block Type 2 (SIB2), which includes common and shared channel information.

SIB3-SIB8, which include parameters used to control intra-frequency, inter-frequency and inter-RAT (Radio Access Technology) cell reselection.

SIB9, which is used to signal the name of a Home eNodeB (HeNB).

SIB10-SIB12, which includes the Earthquake and Tsunami Warning Service (ETWS) notifications and Commercial Mobile Alert System (CMAS) warning messages.

SIB13, which includes Multimedia Broadcast Multicast Services (MBMS) related control information SIB14, which is used to configure Extended Access Class Barring.

SIB15, which is used for convey MBMS mobility related information.

SIB16, which is used to convey Global Positioning System (GPS)-related information.

This list of System Information Block Types has been expanding over the years and it is expected to continue increasing during the upcoming 3GPP releases.

3GPP defines as "essential information", the information contained in MIB, SIB Type 1, and SIB Type 2. For wireless communication devices capable of Extended Access Barring (EAB), the information in SIB Type 14 is also considered to be essential information. "Essential information" means that the wireless communication device should acquire the information prior to accessing the network or prior to performing an access attempt.

Access information is constantly broadcasted, but depending on the type of information, different periodicities are assumed. In LTE the time-domain scheduling of the MIB and SIB1 messages is fixed with periodicities of 40 ms and 80 ms, respectively. Furthermore, for the MIB the transmission is repeated four times during each period, i.e. once every 10 ms. SIB1 is also repeated four times within its period, i.e. every 20 ms, but with different redundancy version for each transmission.

The time-domain scheduling of the system information messages (for the other SIBs) is dynamically flexible: each system information message is transmitted in a defined periodically-occurring time-domain window, while physical layer control signaling indicates in which subframes within this window the SI is actually scheduled. The scheduling windows of the different system information messages (referred to as SI-windows) are consecutive (i.e. there are neither overlaps nor gaps between them) and have a common length that is configurable. SI-windows can include subframes in which it is not possible to transmit system information messages, such as subframes used for SIB1, and subframes used for the uplink in TDD.

System information, i.e. the system configuration of the wireless communication network, may be scheduled in the time-domain using subframes to transfer the MIB, SIB1 and four SI messages. For example a SI window of length 10 subframes may be used as shown in FIG. 1.

The physical channel which this information is transmitted on may differ from block to block. For example, the MIB is transmitted over the Physical Broadcast Channel (PBCH) as shown in FIG. 3, while the other SIBs are transmitted over the Physical Downlink Shared Channel (PDSCH) so they can be flexibly scheduled in other portions of the frequency band.

When it comes to the amount of information, the MIB contains 14 information bits (with additional 10 spare bits for future use and a 16 bit CRC) while SIB1 and SIB12 may contain up to 1000 bits, which makes them expand over more than 6 RBs (although they may have a different coverage requirement, thus lower repetition rate).

However, the access information necessary to access the network may become invalid as the access information necessary to access a wireless communication network 102 may change or has to be reacquired. Such a change of access information for a certain cell is illustrated in FIG. 3. The change of access information is indicated by the different shading of blocks BCCH-P1 and BCCH-P2, the different shading indicating different content.

In LTE, system information normally changes only at specific radio frames whose System Frame Number is given by SFN mod N=0, where N is configurable and defines the period between two radio frames at which a change may occur, known as the modification period. Prior to performing a change of the access information, the E-UTRAN notifies the wireless communication devices by means of a Paging message including a SysteminfoModification flag.

LTE provides two mechanisms for indicating that SI has changed:
  A paging message including a flag indicating that SI will be changed at the start of the next modification period.
  A value tag in SIB1 which is incremented every time one or more SI message changes.

Wireless communication devices in RRC_IDLE mode use the first mechanism, while wireless communication devices in RRC_CONNECTED mode can use either mechanism; the second being useful, for example, in cases when a wireless communication device was unable to receive the paging messages.

Wireless communication devices in RRC_IDLE mode are only required to receive the paging message at their normal paging occasions—i.e. no additional wake-ups are expected to detect changes of access information. In order to ensure reliability of reception, the change notification paging message is normally repeated a number of times during the BCCH modification period preceding that in which the new system information is first transmitted. Correspondingly, the modification period is expressed as a multiple of the cell-specific default paging cycle.

Wireless communication devices in RRC_CONNECTED mode are expected to try receiving a paging message the same number of times per modification period as wireless communication devices in RRC_IDLE mode using the default paging cycle. The exact times at which wireless communication devices in RRC_CONNECTED mode which are using this method have to try to receive a paging message are not specified; the wireless communication device may perform these tries at convenient times, such as upon wake-up from DRX, using any of the subframes which are configured for paging during the modification period. Since the eNodeB anyway has to notify all the wireless communication devices in RRC_IDLE mode, it has to send a paging message in all subframes which are configured for paging (up to a maximum of four subframes per radio frame) during an entire modification period. Connected mode wireless communication devices can utilize any of these subframes. Thus an overhead of transmitting paging messages to notify wireless communication devices of a change of SI arises.

If the wireless communication device receives a notification of a change of system information, it starts acquiring access information from the start of the next modification period. Until the wireless communication device has successfully acquired the updated access information, it continues to use the existing parameters of access information, which e.g. may be present, preferably stored, in the wireless communication device. If a critical parameter changes, the communication may be seriously affected. However, if the wireless communication device returns to a cell, it is allowed to assume that the access information previously acquired from the cell remains valid if it was received less than 3 hours previously and a value tag matches.

Figure 4:
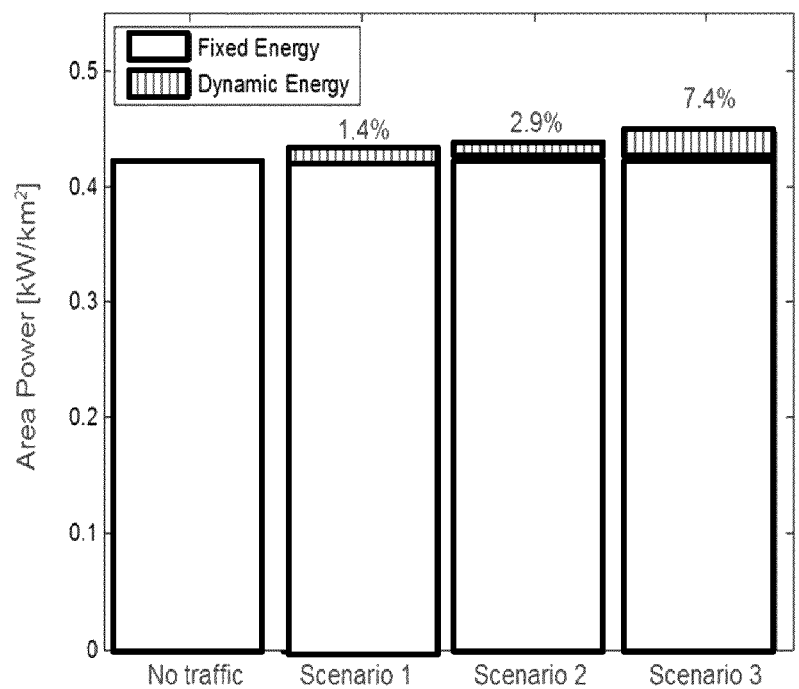
FIG. 4 illustrates the energy consumption of a typical country-wide wireless communication network.

Some results from energy consumption in mobile networks have shown that a non-negligible part of the mobile operator's energy consumption from their mobile networks comes from the physical layer processing and transmission as shown in FIG. 4. This can be justified in scenarios where there is always traffic in a given area, however, due to the LTE design there is almost constant and high energy consumption even when there is no traffic in a given cell. FIG. 4 shows the energy consumption for one LTE network in Europe for the following scenarios:
  Scenario 1: "the most relevant traffic scenario for 2015"
  Scenario 2: "an upper bound on the anticipated traffic for 2015"
  Scenario 3: "an extremity for very high data usage in future networks"

As one can see from the results, there is a high consumption even without much traffic. A large part of the energy comes from the constantly transmitted Cell-specific Reference Symbols (C-RS), broadcasted over the whole bandwidth.

The way access information is acquired in LTE still represents a non-negligible amount of signals constantly broadcasted over the air interface, even though this is not essential and could be removed in future system. The benefit of the scheme is that the latency to access the network, e.g. when powering on, recovering from radio link failure (RLF) or roaming is reasonable.

A scenario different to LTE in order to access a wireless communication network 102 will be described in the following. This is especially important since energy efficiency is likely to be an important requirement for future wireless communication networks, such as radio networks as e.g. 5G. As shown above in FIG. 4, a considerable amount of energy is taken by reference signals and access information. There may be a situation in which cells do not carry any traffic or do not have users. Therefore, there would be a potential advantage if the network 102 could adapt its reference signals and system broadcast of access information to minimize energy consumption during those periods.

In order to minimize the reference signals and access information, a solution with the following design principles is addressed improving energy efficiency:
  Not all access nodes in the network do need to broadcast the access information;
  Access nodes transmitting access information may aggregate and access information, e.g. configurations (cf. configurations A, B, C, D, E, F, X, Y, Z in FIGS. 13 to 16) and/or identifiers (cf. identifiers x, y, z, w, k, p in FIGS. 13 to 16) mapped to these configurations, may be transmitted from different nodes in the network. The aggregated access information is referred as Access Information Table (AIT);
  These configurations and their identifiers may be transmitted frequently (e.g. every few dozens of milliseconds) up to infrequently (e.g. every few seconds);
  Each specific configuration (e.g. an entry in the AIT) contains essential information for network access, i.e. similar as the essential information in LTE which is contained in MIB/SIB1/SIB2;
  Each access node may transmit a system signature index (SSI) which is basically the identifier associated to a given configuration i.e. an entry in the AIT;
  A SSI may have similar properties and content as the PSS/SSS synchronization signals in LTE;
  A wireless communication device detecting the SSI and having a (valid) stored AIT knows the access information to access that node;
  SSI may be transmitted often (in the order of dozens to hundreds of milliseconds).

Figure 5:
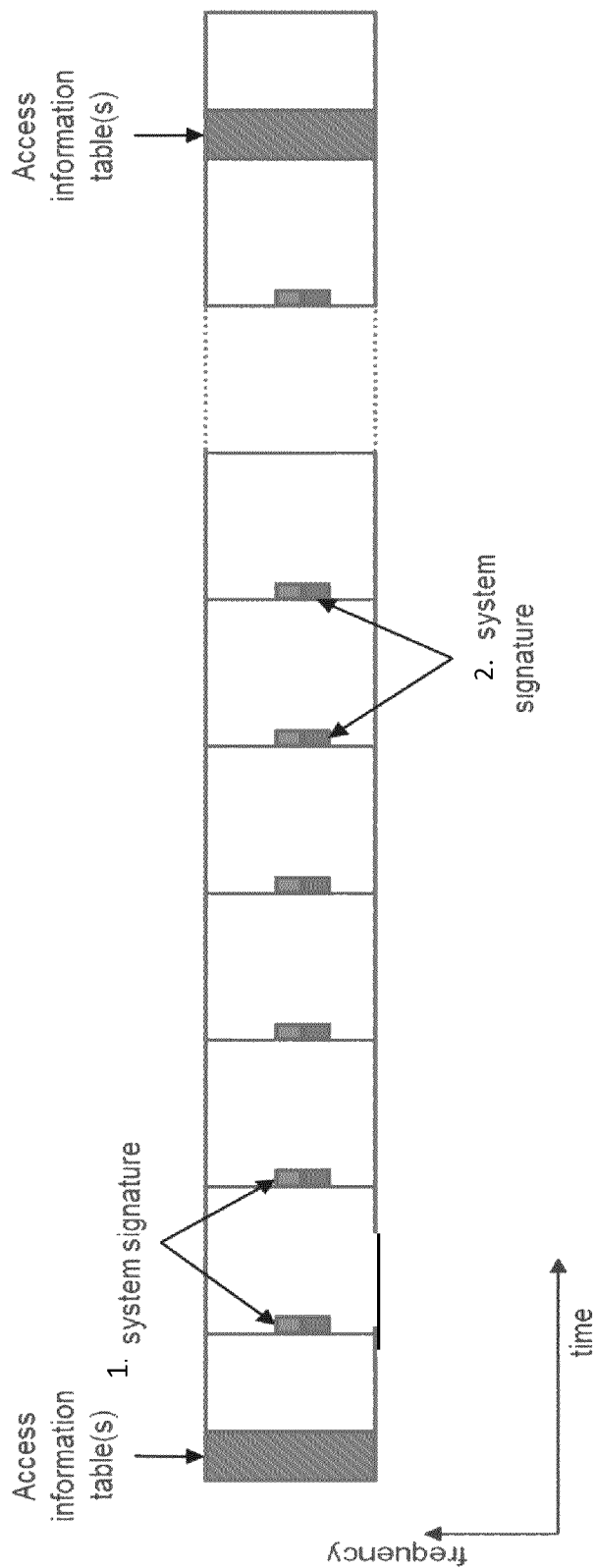
FIG. 5 illustrates an alternative concept for scheduling of parameters of a system configuration in the case the system configuration has changed.

In FIG. 5 the transmission of access information in the form of an access information table and the transmission of a "1.system signature" corresponding to a first identifier (SSI) pointing to a configuration in the access information table and a "2.system signature" corresponding to a second identifier (SSI) pointing to another configuration in the access information table is illustrated. The "1.system signature" and the "2.system signature" may be transmitted from the same or different access nodes as the case may be; such scenarios are illustrated in FIGS. 11 and 12 respectively. An identifier such as the system signature may be transmitted or broadcasted from the network 102 e.g. in the control plane. Thereby the amount of broadcast information is reduced by assuming that the wireless communication device 101, 110 has access to the possible configurations (e.g. from an internally stored copy of a previously received AIT) and only uses the broadcasted identifiers which can be called system signatures (i.e. SSIs) to point to the correct configuration for a given access node or cell.

While the approach above focuses on minimizing network energy consumption, it may potentially impact the access delay when one or more wireless communication devices have no prior information before accessing the system. This occurs due to the following reasons:

part of the access information, e.g. the access information database, for example in the form of an access information table (AIT), is possibly broadcasted very infrequently (e.g. every 10 seconds), wherein other parts such as the identifiers (called SSI here) may be transmitted more often, but there can be scenarios where the wireless communication device needs to acquire new access information, e.g. in the form of an access information database, for example an AIT, which can take a long time to access the network.

This certainly reduces the amount of broadcasted information but can lead to very long delays in the case the wireless communication device 101 needs to acquire the access information, e.g. an AIT.

Thus, the LTE network access scenario allows a short-term network access when the wireless communication device has no prior access information, whereas in the so call alternative scenario, denoted as System Control Plane (SCP) as described in the above in conjunction with FIG. 5, allows an energy efficient network access. On the other hand the LTE scenario is energy inefficient whereas in the SCP scenario network access may take a long time in case the wireless communication device cannot use a priori information, such as an AIT.

These solutions for accessing a wireless communication network attempt to reduce the time to access the system in a number of different scenarios (e.g. when the wireless communication device has no prior information about the system, as when powering on or roaming) but have as the major drawback the high energy consumption or waste due to the constantly broadcasted reference signals and information, especially in the case where there are many cells without traffic during certain periods.

This unnecessary energy consumption (and potential generated interference to wireless communication devices in other cells) in these empty cells/low traffic scenarios comes from the fact that network access in LTE depends on the following broadcasted information over the air, in particular via the control plane:
  PSS/SSS for physical layer synchronization and PCI detection
  MIB, SIB1 and SIB2 (about 1000 bits over the air within a repeated window of a few hundred milliseconds)
  C-RSs at least within the bands of MIB, SIB1 and SIB2.

This reduces the time to access the network 102 for devices 101, 110 that want to access that empty cell without having any prior information about the cell; however this is not an energy efficient solution. Schemes not relying on broadcasted signals have the potential to reduce the energy consumption, mainly for cells with low traffic density, but may compromise the latency to access the system. One way to speed up the latency to access the network 102 is to reuse previously acquired network information such as previously acquired access information. However, the usage of a given network access information that is not expected or set by the network 102 can potentially cause problems to the network (and consequently to other users) or increase even more the latency to access the system, which is bad for the end user.

The solution according to SCP, as described in the above, is designed to be energy efficient and low latency to access, leveraging on the assumption that access information is semi-static and a wireless communication device can rely on opportunistic access, i.e. try to access the network assuming that at least part of the access information remains unchanged and does not need to be (re-)acquired before an access attempt.

Figure 6:
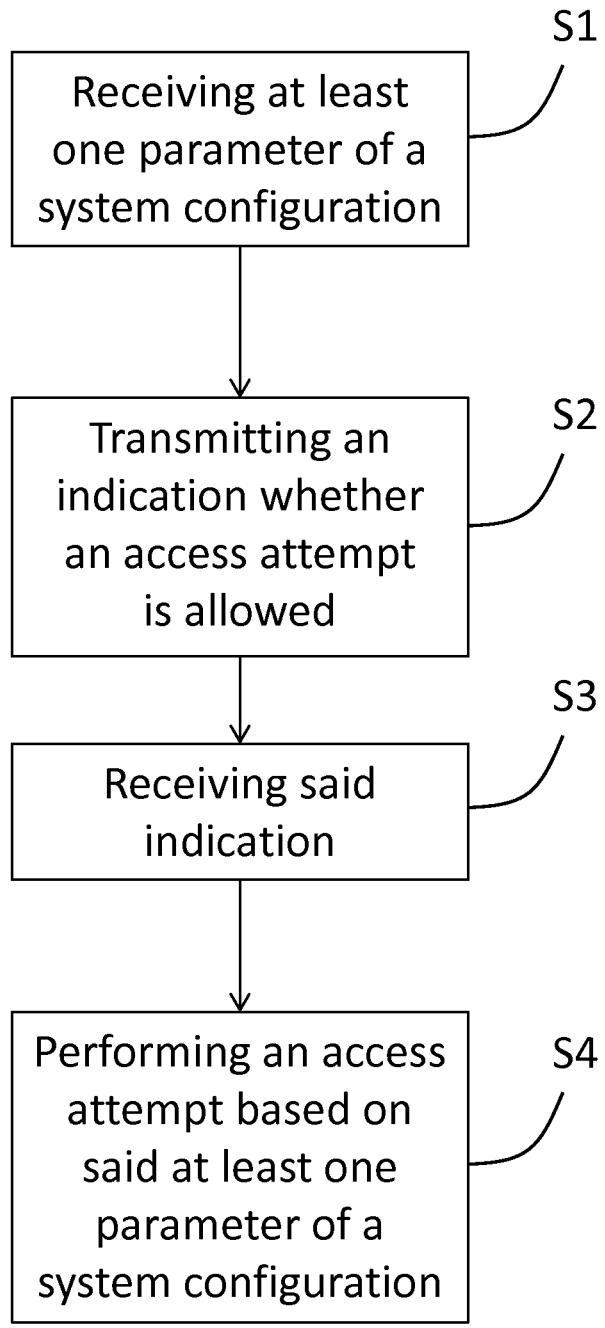
FIG. 6 shows a flow chart illustration of an embodiment for controlling access to a wireless communication network.

FIG. 6 shows a flow chart illustration of an embodiment for controlling access to a wireless communication network.

For accessing a wireless communication network 102, in short network, access information may be required. This access information may be required in order to perform an access attempt and/or to gain access to the network. Access is to be understood as assigning radio resources for up- and/or downlink to a wireless communication device. By access to the network 102 a connection, e.g. for exchanging data, between the wireless communication device 101 and the network is thus established.

According to an embodiment network access of at least one wireless communication device to a wireless communication network is controlled. Access control may be carried out by the network and/or the wireless communication device. Controlling is to be understood as allowing or denying a wireless communication device 101 access to the network 102. However, controlling may also comprise transmitting and/or receiving access information, evaluating access information and/or any kind of processing of access information.

The decision of allowing or denying access may be dependent on certain circumstances present in the network 102 and/or the wireless communication device 101, for example the number of wireless communication devices already present in the network and/or the availability of radio resources. According to a first step S1 first access information are received by said wireless communication device. The first access information may also be stored in the wireless communication device 101, e.g. after receiving it. The first access information may be received via a wired or wireless connection or stored in a memory unit inserted in the device. The first access information may be derived from a setting and/or configuration of the wireless communication network and may be transmitted to the wireless communication device.

Access information may be information related to bandwidth, network ID, physical land mobile network information, tracking area code and/or other kind of network configuration. Especially, the information contained in MIB and/or SIB as described in the above may be part of the first access information or access information in general.

In a second step S2 an indication, indicating whether an access attempt is allowed to the network based on access information present in the wireless communication device, whose validity is undetermined, is transmitted by the network. Preferably said indication is transmitted via a radio link between the network and the wireless communication device. Said indication is preferably transmitted by way of a broadcasted or a multicast to not only one but a plurality of wireless communication devices. Thus a group of wireless communication devices in a cell or a coverage area of an access node may be controlled. Said indication may also be transmitted via a control plane. The indication may be transmitted by an network node of the wireless communication network, in short network node. This network node may be an access node 120 of said wireless communication network, such as an eNodeB.

The access information present in the wireless communication device 101 may be the first access information received by the wireless communication device previous to the indication and/or previous to a (directly) preceding sleep phase. The access information present in the wireless communication device 101 may be contained, thus stored, e.g. in a memory (unit) in the wireless communication device 101.

Instead of updating the first access information present in the wireless communication device the (potentially outdated, i.e. invalid) first access information may hence be (re-) used for a network access attempt. Thus after receiving the indication from the network the wireless communication device may (re-)use previously acquired access information for an access attempt. As explained in the above, access information may change over time. The wireless communication device may hence make use of access information or at least part of access information received or acquired, e.g. before access information required for accessing the network, has changed, for example because the network settings and/or configuration has changed or the wireless communication device is in the coverage area of a different cell.

Validity of the access information thus may refer to that a predefined criterion is met. Validity of access information, such as the first access information, may be determined based on a timer. Said timer may be set to run for a predetermined period of time for which said (first) access information received by the wireless communication device are presumed valid and presumed invalid after the timer has run out. Validity may also refer to the case that access information corresponds to the system configuration (actually) employed by the network 102 and the wireless communication device 101 may thus successfully gain access to the network 102. However, if the access information is invalid the wireless communication device configuration may not correspond to the one currently employed by the network 102 and consequently no connection to the network can be established.

The wireless communication device 101 may be configured not to check whether the first access information is valid. The validity may then be undetermined. Consequently the wireless communication device 101 may for performing an access attempt relying (solely) on the indication transmitted by the network 102.

In a third step S3 said indication is received by the wireless communication device. The step of receiving may comprise the step of decoding and/or storing said indication in said wireless communication device. Further on, the step of receiving may be followed by an additional step of evaluating said indication, whether it is indicating that access is allowed based on access information present in the wireless communication device whose validity is undetermined.

In a further step S4 said access attempt is performed by said wireless communication device 101 based on at least part of said first access information. For said access attempt at least part of said first access information or information derived therefrom is (re-)used by the wireless communication device 101 if the indication transmitted by the network 102 is set accordingly, i.e. is set to a value allowing said access attempt based on said first access information. The indication may of course be changed and set to a value indicating that said first access information may not be re-used in an access attempt to the network 102.

Transmitting said indication by the network 102 may be carried out by way of a multicast, in order to be received by a plurality of wireless communication devices 101, 110, e.g. by way of a broadcast in a cell, by said wireless communication network 102, e.g. via an access node 120. Hence, a network access attempt may be allowed to a plurality of wireless communication devices 101, 110 based on the access information present in the respective wireless communication device. However this access information on which a respective access attempt is based may be different in the different devices 101, 110. As explained in the above, said (first) access information may be stored in said wireless communication device 101.

The wireless communication device 101 may however determine whether at least part of the first access information is valid, in particular before receiving or determining said indication or before performing said access attempt.

Additionally or alternatively, the wireless communication device may determine whether at least part of the first access information is valid, in particular after receiving said indication and/or before evaluating the content of the indication transmitted by the network 102.

Validity may be determined based upon a timer, a counter or a predefined condition. The result of said determining step (before or after receiving said indication), not explicitly shown, may be that the first access information is valid. The wireless communication device 101 may then perform an access attempt to the network 102 based on said first access information. In that case the indication transmitted by the network may then be disregarded.

In case the status of the first access information is undetermined, the wireless communication device 101 may perform an access attempt based on said first access information if indicated by the indication transmitted/receive. In this case an access attempt is granted relying on the indication transmitted by the network/received by the wireless communication device. In particular the access attempt can be performed after evaluating said indication.

In case the result of the determining step is that the first access information is invalid the wireless communication device may update or initiate an updating procedure for obtaining new access information. Also in this case, the indication transmitted by the network/received by the wireless communication device may be disregarded and access information may have to be re-acquired and/or updated in order to perform an access attempt. Thus, second access information may be received by the wireless communication device, e.g. from the network.

Consequently, access to the network is established if the first access information is valid or the validity of the first access information is undetermined and the indication transmitted by the network/received by the wireless communication device indicates that an access attempt is allowed based on access information whose validity is undetermined. Otherwise the access information may have to be re-acquired.

The step of determining whether said first access information is valid may further comprise determining whether at least part of the first access information is outdated, e.g. by evaluating a timer, a counter and/or comparing at least a part of the first access information to at least a part of newly received, second access information or by another predetermined condition. The newly received, second access information may be transmitted from the network, e.g. from a network node such as an access node.

Nevertheless the wireless communication device may be configured such that the indication overrides the result of determining whether the access information present in the device is valid. In such a case the wireless communication device relies solely on the indication when determining whether an access attempt is allowed or not.

The access attempt may comprise a random access procedure. The random access procedure may further comprise transmitting a random access preamble by the wireless communication device and/or an identity of the wireless communication device 101 to the network.

Second access information, preferably for said access attempt, may be received from the network, and the wireless communication device may then perform an access attempt at least partially based on said second access information. The second access information may be transmitted from a network node such as an access node, which also may transmit said indication, and may also be stored in said wireless communication device 101.

The access attempt may be performed after an inactive phase of the wireless communication device 101, e.g. after a sleep phase, in which the wireless communication device is not transmitting to and/or receiving data from the wireless communication network, e.g. via a radio link. Said inactive phase may also be an inactive phase during a discontinuous reception (DRX) or discontinuous transmission (DTX) mode of the wireless communication device. Said inactive phase may also be a phase having reduced power consumption in relation to a normal operating phase, for example during which the wireless communication device is transmitting and/or receiving data from the network. After waking up from such an inactive phase the wireless communication device may receive said indication from the network and either rely on the first access information previously received or may have to reacquire new, second access information.

The first access information may thus be received before an inactive phase, e.g. a sleep phase, in which the wireless communication device does not transmit data to and/or receive data from the wireless communication network. The first access information may be received from a first access node whereas the second access information is received from a second access node, said second access node requiring different access information than said first access node.

The indication transmitted by the network may comprise at least one two-valued indicator. The access attempt may thus be performed on said first access information dependent on the value of said indicator. The wireless communication device may then determine whether the indicator is set to a value allowing said access attempt based on said first access information contained in the wireless communication device.

If access is allowed according to the value of the indicator the wireless communication device may perform said access attempt based on said first access information, and else await second access information from the network for said access attempt.

The second access information may be utilized in an access attempt to said wireless communication network, in case said indicator is set to a value not allowing utilizing the first access information in said access attempt.

The wireless communication network may comprise a plurality of access nodes, and said first access information may be associated with a first access node, and said second access information may be associated with a second access node. The first and second access node may make use of identical or different access information. Consequently, the access Information for access the network via the first or second access node may differ, i.e. different configurations for network access may be used.

The wireless communication network 102 may comprise a plurality of access nodes, and said first access information being associated with a first access node at a first point in time, and said second access information being associated with said first access node at a second point in time.

The first access information may be received by the wireless communication device 101 from a first access node and, said indication may also be received by the wireless communication device from the first access node. However, e.g. in case the wireless communication device has in the meantime left the coverage area of the first access node, said first access information may be received from a first access node and, said indication may be received from a second access node.

The first access information may be determined based on a first access information database, e.g. a system access information table, containing a plurality of access information and a first identifier for identifying at least one access information out of said plurality of access information.

The second access information may be determined based on said first access information database (AIT-1), e.g. a system information table, and/or a second access information database (AIT-2) containing a plurality of access information and a first identifier (SSI-1), preferably transmitted from said first access node, for identifying at least one access information out of said plurality of access information, and/or a second identifier (SSI-2), preferably transmitted from said second access node, for identifying at least one access information out of said plurality of access information.

Dependent on said indication said second identifier and/or said second access information database may be obtained and/or utilized in order to determine said second access information. Said indication may be obtained from said second access node.

Preferably said indication is encoded as one, two or more bits. Said indication may be encoded, and preferably transmitted, in the form of a scrambling sequence. Alternatively said indication is encoded and preferably transmitted in the form of a synchronization sequence.

Figure 7:
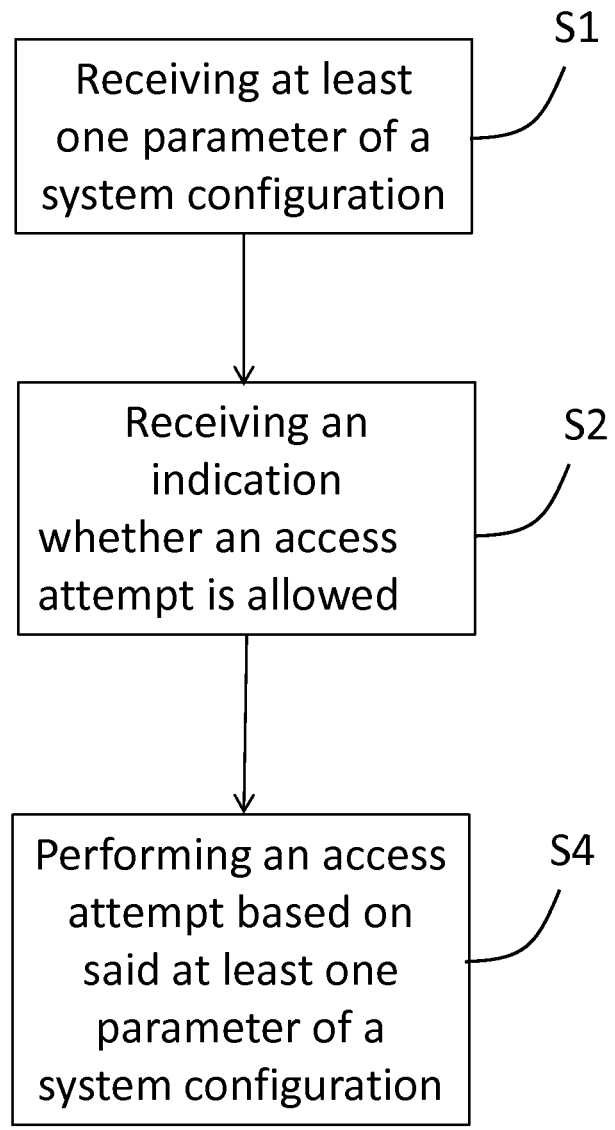
FIG. 7 shows a flow chart illustration of an embodiment for controlling access to a wireless communication network with regard to the wireless communication device.

FIG. 7 shows a flow chart illustration of an embodiment for controlling access control to a wireless communication network 102 performed by a wireless communication device 101. The implementation(s) as described in accordance with FIG. 6 also apply to the embodiment of FIG. 7 but are now for clarity's sake explained with the focus on the wireless communication device 101.

In a first step 51 first access information is received by the wireless communication device 101. In a second step S2 an indication, for connecting to the wireless communication network indicating whether an access attempt is allowed to the network based on access information whose validity is undetermined and present in the wireless communication device, is received. In a third step S4 an access attempt may be performed by the wireless communication device 101 based on said first access information. Performing the access attempt may however depend on the indication received from the network 102. The indication indicates whether an access attempt based on potentially invalid, e.g. outdated access information, may be performed.

Figure 8:
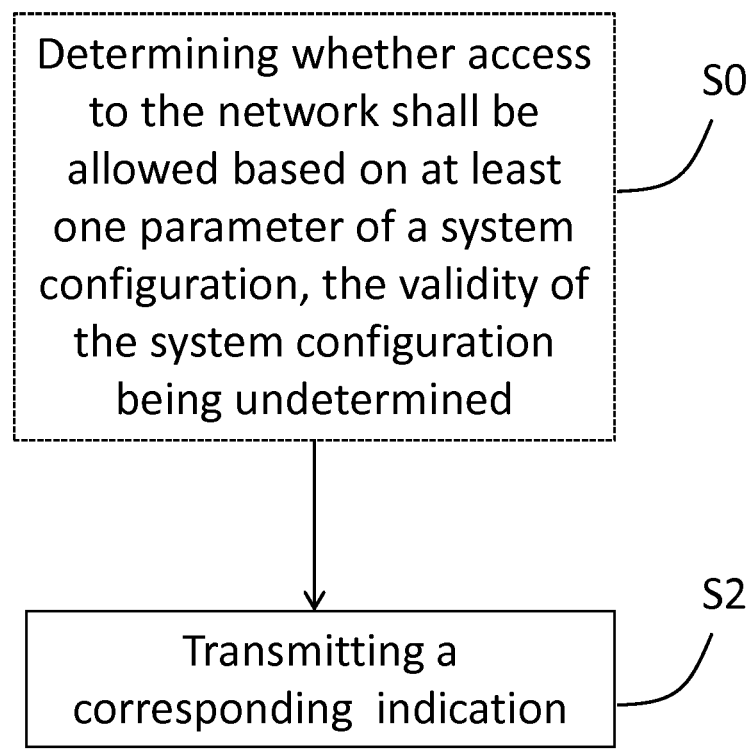
FIG. 8 shows a flow chart illustration of an embodiment for controlling access to a wireless communication network with regard to the wireless communication device.

FIG. 8 shows a flow chart illustration of an embodiment for controlling access to a wireless communication network 102 performed by a wireless communication network 102 or one or more network nodes 120, 130 of a wireless communication network 102. The implementation(s) as described in accordance with FIG. 6 and FIG. 7 also apply to the embodiment of FIG. 8.

The steps S0 and S2 may be performed by one or more network nodes of the wireless communication network 102. Such network nodes may comprise one or more access nodes such as a base station, e.g. a NodeB, eNodeB etc.

In a first step S0 the network 102 may determine whether an access attempt to the network shall be allowed based on access information whose validity is undetermined. Such a scenario is described in the following figures and the corresponding description. An indication, for connecting to the wireless communication network indicating whether access is allowed to the network based on access information whose validity is undetermined and contained in the wireless communication device, corresponding to the result of the determining step S0 the indication may be transmitted. Instead of determining said indication the network 102 may be pre-configured by a user such as e.g. the network operator to transmit an indication with the desired content, i.e. set the indication to allow or to deny an access attempt based on access information whose validity is undetermined. However, there may be an operating mode of the network or an access node in which the indication is not transmitted.

The transmission of the indication may be performed as an (explicit) signal intended for all identifiers, e.g. all SSIs (System Signature Index), associated with a system configuration or it may be embedded in a parameter of the system configuration, e.g. an AIT-entry identified by a particular SSI, or intended for a range of identifiers, e.g. a range of SSIs. The default may be e.g. that an access attempt with a validity of the system configuration being undetermined is only allowed for some identifiers. This information can be provided in an access information database, e.g. transmitted by another node and preferably valid throughout the (whole) network. The information about which system configuration to use for an access attempt may also put on the SIM card (Subscriber Identity Module), for example identifiers, e.g. SSIs 100-200, the wireless communication device 101 may use unvalidated access information. In that case the wireless communication network 102 may not have to perform the step of "determining" S0 of the indication and/or the step of "transmitting" S2 of the indication. Also, the network 102 may still respond to an access attempt by the wireless communication device 101 even though the access attempt is performed is using an invalid system configuration, e.g. a system configuration not corresponding to the one actually employed by the network 102.

Figure 9:
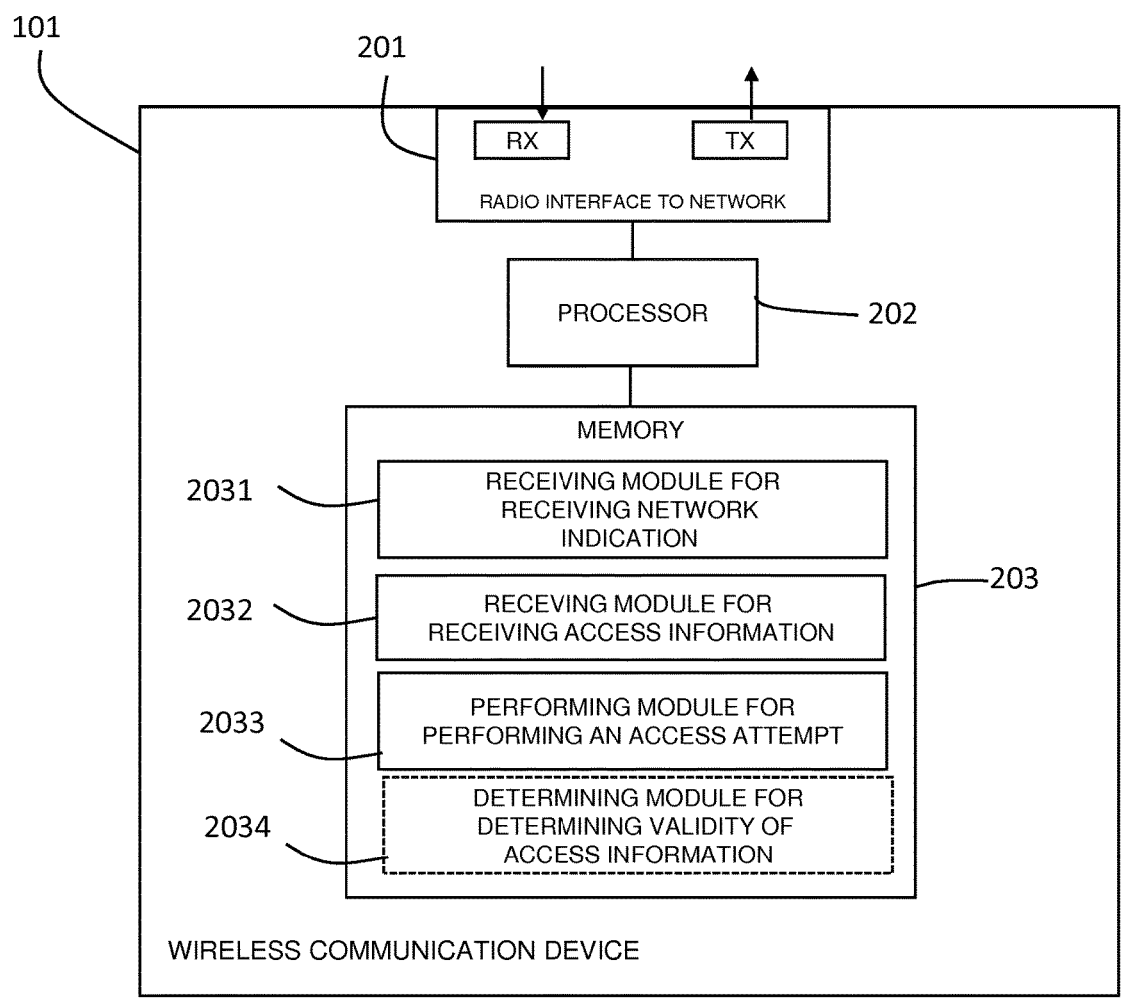
FIG. 9 schematically illustrates exemplary structures for implementing the above-described concepts in a wireless communication device.

FIG. 9 schematically illustrates exemplary structures for implementing the above-described concepts in a wireless communication device 101.

For connecting to the wireless communication network 102 the wireless communication device 101 may be adapted to: Receive an indication, indicating whether an access attempt is allowed to the network 102 based on access information whose validity is undetermined and present in the wireless communication device.

The wireless communication device 101 may comprise an interface 201 and at least one processor 202, wherein said at least one processor is adapted to receive an indication via said interface 201 and to allow an access attempt to a wireless communication network 102, based on first access information contained in the wireless communication device, e.g. in memory (unit) 203, dependent on said indication.

The wireless communication device 101 may further be adapted to perform any of the method steps according to any one of the embodiments of FIGS. 6 and 7.

According to the structure illustrated in FIG. 9, the wireless communication device includes radio interface 201 for performing data transmission to or from the network 102 via a radio link. It is to be understood that for implementing transmitter (TX) functionalities the radio interface 201 includes one or more transmitters, and that for implementing receiver functionalities (RX) functionalities the radio interface 201 may include one or more receivers. In the above-mentioned scenarios, the radio interface 201 may correspond to the Uu interface of the Evolved Universal Terrestrial Radio Access Network (E-UTRAN) or according to IEEE 802.11 a/h, b/g, n, ac and/or make use of radio frequencies according to IEEE 802.11 a/h, b/g, n, ac and/or data rates according to IEEE 802.11 a/h, b/g, n, ac.

Further, the wireless communication device 101 includes a processor 202 coupled to the radio interface 201 and a memory (unit) 203 coupled to the processor 202. The memory (unit) 203 may include a ROM, e.g., a flash ROM, a RAM, e.g., a DRAM or SRAM, a mass storage, e.g., a hard disk or solid state disk, or the like. The memory (unit) 203 includes suitably configured program code to be executed by the processor 2002 so as to implement the above-described functionalities of the wireless communication device 101. More specifically, the memory (unit) 203 may include respective modules 2031, 2032, 2033 for accomplishing the provision of: a receiving module 2031 for receiving access information, a receiving module 2032 for receiving said indication, allowing or denying an access attempt based on access information previously obtained, and/or a performing module 2033 for performing an access attempt to the network, e.g. to an access node, based on said access information. Further on, the wireless communication device 102 may comprise determining module 2034 for determining whether the access information present in the wireless communication device are valid or deemed valid. As explained, this may be determined based on a timer, a counter or other information, e.g. newly received, access information. The determining of the validity of the present access information may be carried out before or after receiving said indication whether an access attempt is allowed based on the access information present in the wireless communication device 101.

The information present in the wireless communication device may have been received by the wireless communication device previously and are also referred to as first access information.

It is to be understood that the structure as illustrated in FIG. 9 is merely schematic and that the wireless communication device 101 may actually include further components which, for the sake of clarity, have not been illustrated, e.g., further interfaces or additional processors. Also, it is to be understood that the memory (unit) 203 of the wireless communication device 101 may include further types of program code modules, which have not been illustrated. For example, the memory (unit) 203 may include program code modules for implementing typical functionalities of a wireless communication device 101, e.g. LTE and/or WLAN communication, or program code of one or more applications to be executed by the processor. According to some embodiments, also a computer program product may be provided for implementing concepts according to embodiments disclosed herein, e.g., a computer-readable medium storing the program code and/or other data to be stored in the memory.

The wireless communication device 101 may further comprise one or more modules for carrying out the steps according to the embodiments as described with regard to FIGS. 1 to 16.

Thus according to an embodiment the wireless communication device 101 comprises an interface 201 and at least one processor 202, wherein at least one processor 202 is adapted to send, via the interface 201 to the first access node, the first access information.

Further on a computer program product is disclosed comprising program code to be executed by a processor of a wireless communication device 101. The program code may be stored in the memory (unit) 203 of the wireless communication device 101. The program code may, when executed, configure the wireless communication device 101 to operate in accordance with a method as defined by any one of the embodiments of FIGS. 6 and 7.

Figure 10:
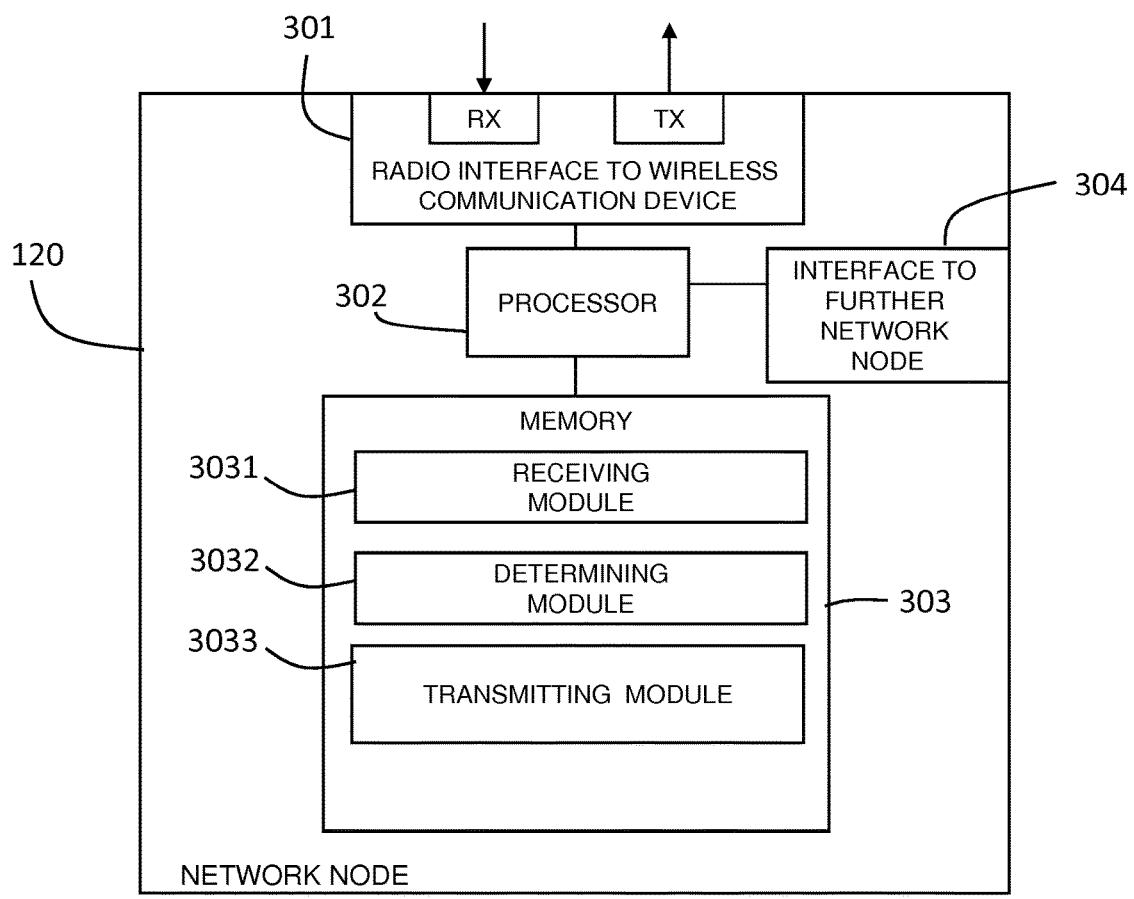
FIG. 10 schematically illustrates exemplary structures for implementing the above-described concepts in a network node.

With regard to FIG. 10, exemplary structures for implementing the above-described concepts in a network node are schematically illustrated. In this case the network node is an access node 120 for wireless communication, and may further on be adapted to transmit an indication for connecting to the wireless communication network 102 indicating whether an access attempt is allowed to the network based on access information whose validity is undetermined and present in the wireless communication device 101. However, any other network node, i.e. another device already connected to the network 102, e.g. another wireless communication device, may comprise the structures as illustrated in FIG. 10 in order to provide the functionalities described.

The access node 120 may comprise an interface 301 and at least one processor 302, wherein at least one processor 302 is adapted to transmit, via the interface 301, said indication allowing and/or denying an access attempt to the wireless communication network 102.

In the illustrated structure, the access node includes a radio interface 301 for performing data transmission to or from the wireless communication device 101 via a first (radio) link. It is to be understood that for implementing transmitter (TX) functionalities the radio interface 301 includes one or more transmitters, and that for implementing receiver functionalities (RX) functionalities the radio interface may include one or more receivers. In the above-mentioned LTE scenario, the radio interface 301 may correspond to the Uu interface of the Evolved Universal Terrestrial Radio Access Network (E-UTRAN). Further, the access node 120 may comprise a further interface 304 for performing data transmission to and from a further network node, such as another access node, via a second link. The further interface 304 may enable wireless and/or wired transmission. Alternatively, the access node may only comprise one interface 301 or 304 implementing functionalities of the above described interfaces.

Further, the access node includes a processor 302 coupled to the radio interface 301 and a memory (unit) 303 coupled to the processor 302. The memory (unit) 303 may include a ROM, e.g., a flash ROM, a RAM, e.g., a DRAM or SRAM, a mass storage, e.g., a hard disk or solid state disk, or the like. The memory (unit) 303 includes suitably configured program code to be executed by the processor so as to implement the above-described functionalities of the first access node. More specifically, the memory (unit) 303 may include respective modules 3031, 3032, 3033 for accomplishing provision of: determining module 3032 for determining a value of said indication, transmitting module 3033 for transmitting said indication, and/or receiving module 3031 for receiving said indication from another network node. Further, the determining module for determining the indication and/or the value of said indication respectively thus serves to allow one or more wireless communication devices 101, 110 an access attempt based on access information present in the respective wireless communication device 101, 110 whose validity is undetermined, i.e. may be outdated, and/or to bar one or more wireless communication devices 101, 110 from performing an access attempt based on access information present in the respective wireless communication device 101, 110 whose validity is undetermined, i.e. may be outdated.

Alternatively, two different determining modules for implementing the aforementioned determining steps as described with regard to FIG. 6 may be provided in the memory.

It is to be understood that the structure as illustrated in FIG. 10 is merely schematic and that the access node 120 may actually include further components which, for the sake of clarity, have not been illustrated, e.g., further interfaces or additional processors. Also, it is to be understood that the memory (unit) 303 may include further types of program code modules, which have not been illustrated. For example, the memory (unit) 303 may include program code modules for implementing typical functionalities of a access node 120 or program code of one or more applications to be executed by the processor. According to some embodiments, also a computer program product may be provided for implementing concepts according to embodiments disclosed herein, e.g., a computer-readable medium storing the program code and/or other data to be stored in the memory. Thus, a computer program product comprising program code to be executed by a processor of the network node may be comprised in said memory (unit). The program code, when executed, may configure the network node to operate in accordance with a method as defined by any one of the steps already described with regard to FIGS. 6 and/or 8. The access node may further comprise one or modules for carrying out the embodiments as described with regards to FIG. 6 or 8.

A communication system is also disclosed hereby comprising a first network node according to any one of the previous embodiments and examples and a wireless communication device according to any one of the embodiments and examples with regard to FIGS. 1 to 16. Said communication system may optionally comprise a second network node according to any one of the previous embodiments and examples relating to a network node. The first and second network node may be access nodes and implemented according to any one of the embodiments and examples as described with regards to FIG. 10.

FIG. 11 shows another illustration of an embodiment for controlling access to a wireless communication network 102. The wireless communication device 101 may be in the coverage area of a first access node 130 or first cell of the network 102 at a first point in time T1. The wireless communication device 101 may have an established connection via a radio link L1 for accessing the network 102 via the first access node or first cell respectively. This connection may have been established using first access information. This first access information may thus be present, e.g. stored, in the wireless communication device 101. At a second point in time T2 the device 101 may be in a sleep phase, e.g. may be powered off or may have entered a DRX, DTX phase or the like, during which the device 101 does not transmit data to and/or receive data from the wireless communication network 102. During this time, depicted by the broad line segment in FIG. 11, the device may leave the coverage area of the first access node 130 or the first cell and enter the coverage area of a second access node 120 or second cell respectively. The respective coverage areas or cells are depicted by the grey areas in FIG. 11. As the case may be the wireless communication device 101 may have to establish a new connection to the network 102 after leaving said sleep phase. Consequently, the access information previously gained may not be valid anymore and/or different access information may be necessary for accessing the network 102 in the second cell or in the second coverage area e.g. of the second access node 120. In the new cell or coverage area an indication may be transmitted in a step S2 allowing the wireless communication device 101 an access attempt based on at least part the access information present in the wireless communication device 101 received previously. The indication may be transmitted in the form of a radio signal. The validity of the access information in the wireless communication 101 device may thus remain undetermined and the device may rely on this access information for an access attempt.

Now referring to FIG. 12, if an access attempt is allowed by the indication transmitted in step S2 from the network 102 the wireless communication device 101 may perform an access attempt in step S4 using the access information present in the device. The validity of the access information present in the device 101 does then not need to be determined, i.e. may stay undetermined. The access attempt of device 101 may thus be based on the access information present. AS described in the above the access information present may have been received previously, e.g. the access information may be related to another cell, coverage area and/or access node such as a base station.

Of course a plurality of wireless communication devices 101, 110 may be present in a cell or a coverage area of an access node 120. The indication transmitted from the network, e.g. via a network node, preferably an access node 120, in step S2 may thus be received by each wireless communication device present, e.g. devices 101, 110, and each device may act according to the content of the indication.

In the case that the indication transmitted in step S2 does not allow an access attempt based on the access information stored in the wireless communication device 101 the wireless communication device 101 may be configured to retrieve new, second access information from the network in step S5. Subsequently the wireless communication device 101 may perform an access attempt based on the second access information in step S6.

In the SCP network access concept presented above, the access information to be assumed unchanged which may successfully be reused can be either of the following:

i) A previously acquired, e.g. the latest acquired, access information database, captured e.g. in an Access Information Table (AIT) with a respective identifier such as a system signature index (SSI);

ii) A previously acquired, e.g. the latest acquired, identifier, e.g. system signature or configuration index (e.g. SSI) pointing to a given access information database;

iii) Both previously acquired, e.g. latest acquired, access information database and identifier.

Thus the indication transmitted by the network may relate to a (re-)use of one or both access information elements, i.e. access information database, e.g. AIT and/or identifier, e.g. SSI. As illustrated in FIG. 12 the indication can be set to either allow or not allow a network access attempt based on the access information present in the wireless communication device 101.

However, access information may change, e.g. when the wireless communication device—possibly after being in a sleep state or out of coverage—has moved to a new area in the network (or another network) where other access information, e.g. another SSI and/or AIT, is being used. Similarly access information in the wireless communication device's present area/node may change without the wireless communication device 101 being aware of it, e.g. because the wireless communication device 101 was in a sleep state while the change occurred.

Figure 13:
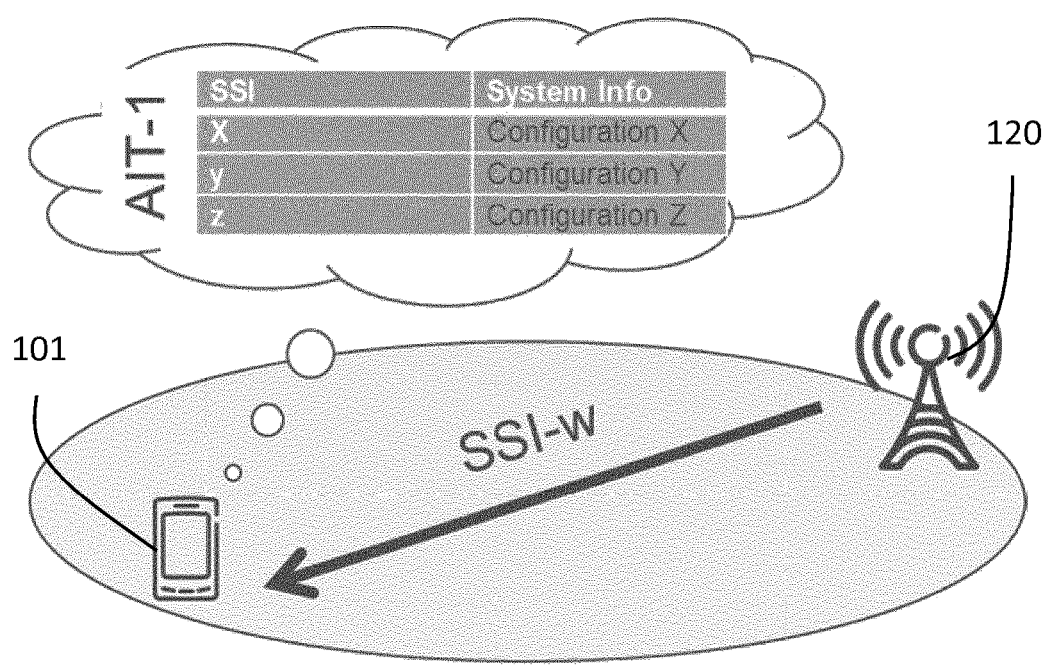
FIG. 13 illustrates an embodiment where only part of the parameters of a system configuration necessary for accessing the network is present in a wireless communication device.
Figure 14:
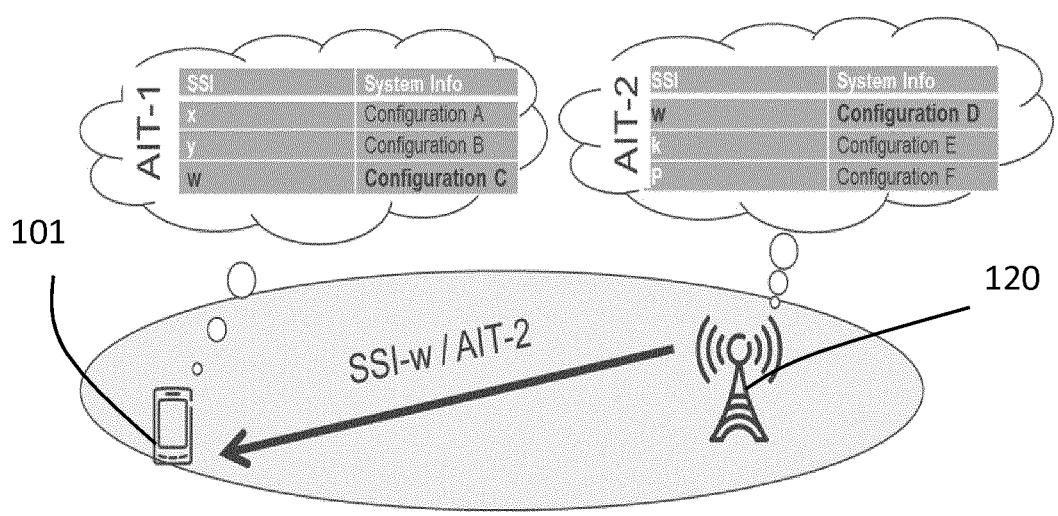
FIG. 14 illustrates an embodiment where the parameters of a system configuration present in the wireless communication device are erroneous.

Now referring to FIG. 13, reuse of the access information database (case i) in the above) basically means that the wireless communication device 101 assumes that its previously acquired access information AIT-1 with SSI-x, SSI-y, SSI-z (e.g. stored in the Universal Subscriber Identity Module (USIM) or possibly another part of the wireless communication device 101) is valid and it only needs to acquire the identifier, e.g. SSI, which may for example be transmitter each 100 ms, before performing an access attempt (e.g. via a random access procedure). By doing this the wireless communication device 101 assumes that the access node 120 sending the identifier, in this case SSI-w, points to a configuration in its access information database. This should be the case if the access node sending the identifier and the access node sending the access information database (which may be the same or different nodes) are coordinated, i.e. the function defining the AIT to be broadcasted is aware that the access node 120 sending the SSI is using a given configuration. However, different scenarios may occur:

First of all, the wireless communication device goes to some sort of sleep phase and wakes up in an area/node broadcasting an identifier, such as SSI-w, that is not present in the wireless communication device's previously acquired access information database, AIT-1. This may be another area/node or the same area/node where the SSI and AIT have changed. In that case, the wireless communication device can simply acquire a new access information database, AIT-2, that has access information associated to identifier SSI-w. This scenario is shown in FIG. 14.

Figure 15:
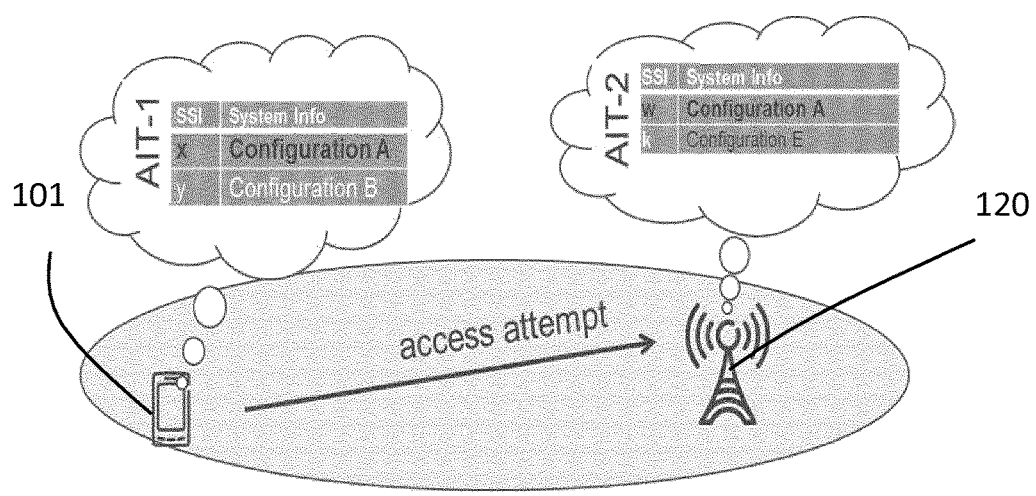
FIG. 15 illustrates an embodiment where the parameters of a system configuration present in the wireless communication are valid.

Secondly, now referring to FIG. 15, the wireless communication device 101 goes to some sort of sleep phase and wakes up in an area/node using an SSI-w that is present in the wireless communication device's previously acquired AIT-1 but points to a configuration not meant by the access node 120 the wireless communication device 101 wants to access. This may be another area/node or the same area/node where the access information database has been changed. In that case a mismatch between the identifier transmitted or broadcasted, in this case SSI-w of AIT-2, and the one in the previously acquired by the device 101, i.e. AIT-1. Some examples of this mismatch are:

- The SSI-w of AIT-1 points to a configuration including a RACH initial power that is much higher than the one configured by AIT-2; therefore, wireless communication devices acquiring AIT-2 will use the proper (lower) power while wireless communication devices re-using previously acquired access information, e.g. AIT-1 will use the higher power regardless of their location in relation to the antenna.
- The SSI-w of AIT-1 points to a configuration including allocation/configuration of RACH resources that are different from the RACH resources configured by AIT-2, which are the RACH resources actually used in the system. This mismatch will result in that the accessing wireless communication device tries to perform random access using erroneous RACH resource, which will cause access failure and potentially severe interference with other wireless communication devices legitimately using the same resources for other kinds of transmission.
- The SSI-w of AIT-1 points to a configuration including a HARQ configuration that is different from that of AIT-2. This mismatch may lead to HARQ failure for both uplink and downlink transmissions, resulting in failure to both transmit and receive data correctly as well as potentially interfering with other wireless communication devices if HARQ feedback is transmitted using the wrong resources.
- The mismatch between different access information databases, AIT-1 and AIT-2, causes the wireless communication device to assume erroneous barring information. This may result in the wireless communication device 101 accessing the network in a node/area where it should actually be barred, or the wireless communication device 101 refrains from accessing the network—assuming that it is barred—in a node/area where it should actually be allowed to access the network 102.
- The mismatch between AIT-1 and AIT-2 causes the wireless communication device to assume an erroneous control channel configuration.

Figure 16:
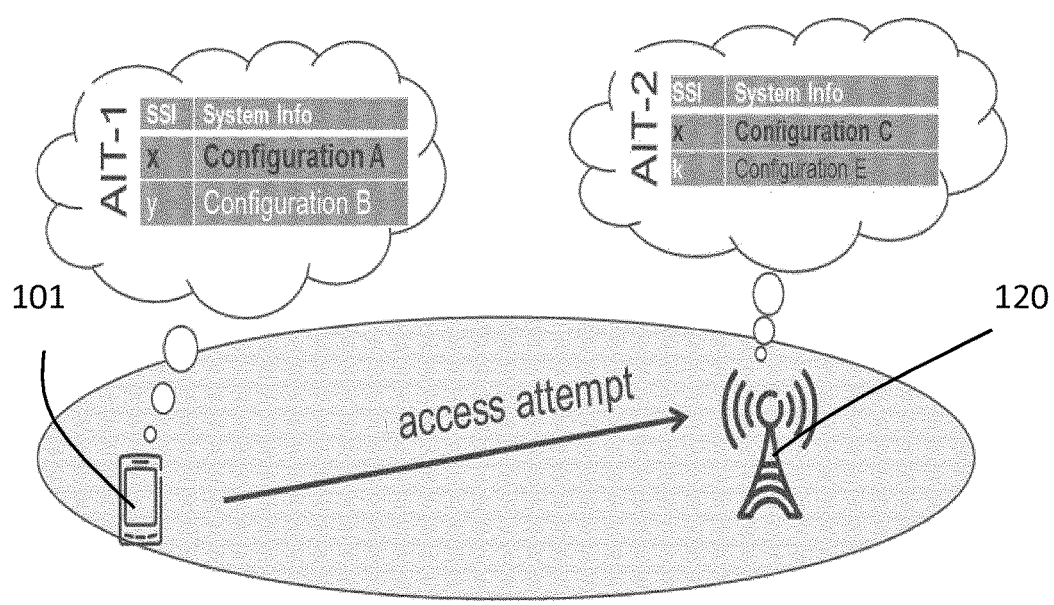
FIG. 16 illustrates another embodiment where parameters of a system configuration present in the wireless communication device are erroneous.

Thirdly, now referring to FIG. 16, reuse of both the identifier, e.g. SSI, and the access information database, e.g. AIT, may occur (corresponding to case iii) in the above). Reuse of both the access information database and the identifier means that the wireless communication device 101 assumes that both the previously acquired AIT-1 (with SSI-x, SSI-y) and SSI-x remain unchanged and can be used before the wireless communication device 101 accesses the system, e.g. via a random access procedure. By doing this the wireless communication device 101 assumes that it is trying to access a node/area using the same identifier, e.g. SSI, with the same meaning which may occur if the wireless communication device 101 does not move or moves to another node/area using the same identifier, e.g. SSI, meaning the same configuration in its access information database, e.g. AIT.

In case the wireless communication device 101 tries to access the network 102 in an access node 120 broadcasting SSI-w pointing to a configuration in AIT-2, wherein the wireless communication device tries to reuse SSI-x associated with AIT-1, which were both previously acquired, either in the same area/node or in another area/node. Different scenarios may occur:

- The wireless communication device 101 goes to some sort of sleep phase and wakes up in an area/node using an SSI-w from AIT-2 that is not pointing to the same configuration meant by SSI-x in AIT-1. This may be another area/node or the same area/node where the SSI has changed (and possibly the AIT too).
- The wireless communication device 101 goes to some sort of sleep phase and wakes up in an area/node which uses SSI-w from AIT-2 which points to the same configuration as meant by SSI-x in AIT-1. This may be another area/node or the same area/node where both the SSI and the AIT have been changed.
- The wireless communication device 101 goes to some sort of sleep phase and wakes up in an area/node using SSI-y also from AIT-1 (i.e. the same AIT as the wireless communication device has previously acquired). This may be another area/node or the same area/node where the SSI has changed from SSI-x to SSI-y.
- The wireless communication device 101 goes to some sort of sleep phase and wakes up in an area/node which uses SSI-x but from AIT-2, i.e. the same SSI as the wireless communication device 101 has previously acquired, but associated with another AIT (AIT-2 instead of AIT-1) and thus potentially pointing to another system information configuration. This may be another area/node or the same area/node where AIT has been changed.

A reuse of part of the access information such as SSI (corresponding to case ii) in the above) may also occur in the following case. Reuse of the SSI basically means that the wireless communication device 101 assumes its previously acquired SSI-x remains unchanged and only acquires a new access information database, e.g. AIT-2, before performing an access attempt and accessing the system (e.g. via random access).

Thus reusing access information, e.g. based on said indication transmitted by the network 102, mitigates the problems of network access, e.g. in terms of the latency to access the network for the end user and the other users (who may suffer from negative consequences of incorrect access attempts) who are also trying to access or communicate with the network 102. Methods where the network indicates whether one or more wireless communication devices are allowed or not allowed to use access information previously received are proposed. In another aspect a method in the wireless communication device 101, where the wireless communication device 101 detects the indication from the network 102 and accesses the network 102 according to this indication, i.e. either attempts to access the network reusing previously acquired access information or waits to access the network until it has acquired access information (e.g. in the form of an AIT) that is sure to be up to date is proposed.

The embodiments described enable efficient control of whether a wireless communication device 101 is allowed to reuse stored access information, in particular network information related to network access. Example realizations of such information that may be reused include an identifier such as a system signature pointing to a access information configuration, e.g. an SSI or another kind of identifier, and/or a set of access information and their respective signature mappings, e.g. an AIT as described in the System Control Plane concept or another kind of access information database. This will allow the wireless communication device 101 to speed up the network access in many cases, while still not risking to compromise (e.g. interfere with) the communication or access attempts of other wireless communication devices.

The embodiments may comprise a method where the network 102 indicates whether the wireless communication device 101 is allowed or not allowed to use access information in different ways. As another aspect the invention also includes a method in the wireless communication device, where the wireless communication device 101 detects the indication from the network and accesses the network according to this indication, i.e. either attempts to access the network 102 using reused access information or waits to access the network until it has acquired access information (e.g. in the form of an AIT) that is sure to be up to date.

The indication from the network 102 may provide information to the wireless communication device on how to act with regards to:

I) Reuse of a set of access information, e.g. the access information configurations in a previously acquired access information database. This concerns whether the wireless communication device may use a previously acquired set of access information as the basis for mapping of the access information identifier the network is transmitting.

II) Reuse of an access information identifier e.g. the previously acquired SSI. This concerns the case where the wireless communication device finds that the system information configuration index, e.g. SSI, being broadcast in the current area/node is the same as in a preceding area/node.

III) Reuse of both a previously acquired access information identifier, e.g. SSI, and its associated access information database, e.g. AIT (e.g. previously acquired SSI and AIT). That is, essentially both of the above cases combined.

In one embodiment the network 102 provides an indication of I) by periodically broadcasting a single bit. This bit may be broadcasted in conjunction with the broadcast of the access information identifier (e.g. SSI) or in conjunction with the broadcast of a set of access information, which may be put in an access information database, e.g. in the form of an AIT or in conjunction with a period of any length in between the lengths of the period of access information identifier broadcasts and the period of a set of access information broadcasts. Optionally, the indication may even be transmitted more frequently than the access information identifier.

Another option is that the indication of I) is encoded in the identifier (e.g. the SSI), e.g. in the form of a scrambling sequence or a certain set (e.g. a dedicated range) of synchronization sequences (e.g. comparable to using a certain subset of the possible SSS sequences (forming part of the PCI). The use of a dedicated range of SSIs for the indication implies that a network operator would have to consider whether a certain access information should be possible to apply both areas/nodes where access or an access attempt is allowed based on previously acquired access information and in an areas/nodes where it is forbidden and/or whether it should be possible to toggle between allowing and denying access or an access attempt in the same area/node. In these cases two different access information identifiers (e.g. SSIs)—one from the range dedicated for non-allowance indication and one from outside that range—to the same system information configuration could be assigned.

In another embodiment the network 102 provides an indication of II). This indication could be realized in the same manner as described above for the indication of I). A difference, however, is that in this case the indication should preferably be broadcasted at least as often as the access information identifier (e.g. SSI).

In yet another embodiment the network 102 provides both an indication of I) and an indication of II) (which combined constitute an indication of III)). These indication(s) could be realized in the manner described above, i.e. two bits would be used for this purpose. These bits could be broadcasted together in either of the ways described above or separately, e.g. with the indication of II) broadcasted more frequently than the indication of I). It is also possible that one of the indications is encoded in the access information identifier (e.g. the SSI), as described above, while the other one is broadcasted separately. Yet another possibility is that both indications are encoded in the access information identifier. Since the combined indications require two bits, it has to be possible to encode four different possible combinations in the access information identifier. Hence, for instance, four different scrambling sequences could be used—one for each combination—or four different synchronization sequences.

When the wireless communication device 101 receives any of the above possible indications, it should adapt its network access behavior accordingly. In the case of I), if the indication indicates that the wireless communication device is allowed to reuse a previously acquired set of access information, e.g. a previously acquired and stored AIT, it receives the broadcasted access information identifier (e.g. SSI) and may apply the access information that the access information identifier points to in the wireless communication device's previously acquired set of access information. On the other hand, if the indication indicates that the wireless communication device is not allowed to reuse a previously acquired set of access information, then the wireless communication device has to wait until it has retrieved the set of access information configurations (e.g. AIT) that is being broadcasted in the current area/node before accessing the network. In that case, the wireless communication device should use the newly acquired set of access information to map the access information identifier to the system information configuration to apply during the network access procedure.

In the case of II), if the indication indicates that the wireless communication device is allowed to reuse a previously known access information identifier (e.g. SSI), the wireless communication device may assume that if the access information identifier broadcasted by the network is one that the wireless communication device knows from before, the broadcasted identifier means (i.e. points to) the same access information configuration as the wireless communication device has derived before (and may go ahead and use this access information configuration when accessing the network). On the other hand, if the indication indicates that the wireless communication device 101 is allowed to reuse a previously known identifier, the wireless communication device 101 has to acquire the set of access information broadcasted in the current area/node and use that to map the broadcasted identifier to the access information configuration to apply during the network access procedure (irrespective of whether the broadcasted identifier is one that the wireless communication device 101 knows from before).

In the case of III) the wireless communication device 101 is allowed to reuse a previously stored access information configuration only if both I) and II) are indicated as allowed. All other combinations of the indications will force the wireless communication device 101 to acquire the set of access information being broadcasted in the current area/node and use that to map the broadcasted access information configuration index to the access information configuration to apply during the network access.

The usage of an indication received by the wireless communication device 101 can be configured in an AIT, for a given SSI or for all SSIs in the AIT. This option has the benefit that wireless communication devices 101, 110 served by the network can save decoding effort if the network does not allow access based on previously received access information.

It may be assumed that the efficient operation of an access node 120, e.g. a radio base station, is the most sensitive to access attempts, when the access information has recently been changed, especially if the change affected parts of the access information that are critical to the network access procedure. In view of this, it is advantageous to use the indication of allowance/non-allowance of access information to bar network access by setting the indication to 'not allowed' when the access information has changed. When a certain time period has elapsed the indication may be changed to 'allowed', based on the assumption that there will then be fewer remaining wireless communication devices that are not updated with the new access information. This procedure could be dependent on the parts of the access information actually changed, e.g. parts of the access information that are considered critical. Optionally, the time period after a change of the access information during which the indication indicates 'not allowed' could depend on which parts of the access information that were changed, e.g. depending on how critical they are assessed to be.

An embodiment thus comprises a method in a access node by which the access node 120 broadcasts an indication of whether a wireless communication device 101 is allowed to use a stored, previously retrieved access information to attempt to access the network 102 in the access node 102. The method may also include that the broadcasted indication is encoded as a single bit of broadcast information. The method may also include that the broadcasted indication is encoded in an access information identifier (e.g. an SSI).

Another embodiment thus comprises also comprises a method in a wireless communication device (e.g. a UE) by which the wireless communication device 101 retrieves and stores a set of access information configurations (e.g. an AIT) being broadcasted in an area/node and wherein the wireless communication device when subsequently considering to attempt to access the network using stored access information, retrieves from an access node a broadcasted indication of whether attempts to access the network using a stored previously retrieved access information and uses the retrieved indication to determine whether to attempt to access the network using the stored access information configuration. The embodiment may further comprise that the wireless communication device 101 performs the determination when considering accessing the network in another area/node than the area/node where the stored system information configuration was retrieved. The embodiment may further comprises that the wireless communication device 101 performs the determination when considering accessing the network in the same area/node as where the stored access information configuration was retrieved, but at a later point in time when the set of access information being broadcasted in the area/node may have changed.

The indication thus allows an access attempt to the wireless communication network 102 based on said first access information dependent on said allowance indication of said wireless communication network 102. An access attempt may thus comprise initiating, triggering a random access procedure and/or establishing a connection between said wireless communication device 101 and said wireless communication network 102.

Modifications and other embodiments of the disclosed embodiment(s) will come to mind to one skilled in the art having the benefit of the teachings presented in the foregoing descriptions and the associated drawings. Therefore, it is to be understood that the described embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for controlling access to a wireless communication network, the method comprising:
   receiving, by a wireless communication device, a parameter of a system configuration for accessing to the wireless communication network, wherein the system configuration is included in an access information database and is associated with an identifier,
   receiving, by the communication device, the identifier from the wireless communication network,
   receiving, by the communication device, an indication from the wireless communication network, the indication indicating whether an access attempt to the wireless communication network is allowed using the parameter of the system configuration with a validity of the system configuration being undetermined and whether the access attempt to the communication network is allowed using the parameter of the system configuration with a validity of the identifier being undetermined, and performing, by the communication device, an access attempt to the wireless communication network, if the indication indicates whether an access attempt to the wireless communication network is allowed using the parameter of the system configuration with a validity of the system configuration being undetermined.

2. The method of claim 1, wherein at least one of the parameters of the system configuration and the identifier is received from a first network node and the indication is received from a second network node which is different from the first network node.

3. The method of claim 1, wherein the indication is embodied as an explicit indication, preferably as a bit, a multibit and/or a bitmap.

4. The method of claim 1, wherein the indication is embodied as an implicit indication, for example derivable from a scrambling sequence.

5. The method of claim 1, wherein said parameter of a system configuration is received before an inactive phase of the wireless communication device.

6. The method of claim 1, wherein the indication is received after an inactive phase of the wireless communication device.

7. The method of claim 1, the method further comprising:
starting a timer, by the wireless communication device, the system configuration being valid during run-time of the timer, wherein the step of performing the access attempt is performed, if the indication indicates whether an access attempt to the wireless communication network is allowed using the parameter of the system configuration with a validity of the system configuration being undetermined and the timer being not expired.

8. The method of claim 1 further comprising the step of:
receiving, by the wireless communication device, another parameter of a system configuration for accessing the wireless communication network, if the indication indicates that an access attempt to the wireless communication network is not allowed using the parameter of the system configuration with a validity of the system configuration being undetermined, the wireless communication device performing an access attempt to the wireless communication network using said another parameter.

9. A non-transitory computer-readable medium comprising, stored thereupon, a computer program product comprising program code to be executed by a processor of a wireless communication device, the program code comprising instructions for causing the processor of the wireless device to carry out the method of claim 1.

10. A method for controlling access to a wireless communication network, the method comprising:
sending, by a network node of the wireless communication network to a wireless communication device an identifier associated with system configuration included in an access information database,
sending, by the network node of the wireless communication network, to a wireless communication device an indication, indicating to a wireless communication device whether an access attempt to the network is allowed using a parameter of a system configuration present in the wireless communication device with a validity of the system configuration being undetermined and whether the access attempt to the configuration network is allowed using the parameter of the system configuration with a validity of the identifier being undetermined.

11. The method of claim 10, further comprising at least one of:
prior to sending the indication, sending, by the network node, to the wireless communication device a parameter of the system configuration for accessing the wireless communication network, and
prior to sending the indication, sending, by the network node, to the wireless communication device an identifier for the system configuration.

12. The method of claim 10, wherein the indication and/or the parameter of the system configuration is sent via one of broadcast and multicast.

13. A wireless communication device, the wireless communication device comprising:
radio interface circuitry; and
processing circuitry operatively coupled to the radio interface circuitry and configured to:
receive a parameter of a system configuration for accessing a wireless communication network, via the radio interface circuitry;
the system configuration being included in an access information database and associated with an identifier, to receive the identifier from the wireless communication network,
to receive an indication from the wireless communication network, via the radio interface circuitry, the indication indicating whether an access attempt to the wireless communication network is allowed using the parameter of the system configuration with a validity of the system configuration being undetermined and whether the access attempt to the communication network is allowed using the parameter of the system configuration with a validity of the identifier being undetermined; and
perform an access attempt to the wireless communication network, using the radio interface circuitry, if the indication indicates that an access attempt to the wireless communication network is allowed using the parameter of the system configuration with a validity of the system configuration being undetermined.

14. A network node of a wireless communication network, said network node comprising:
radio interface circuitry; and processing circuitry operatively coupled to the radio interface circuitry and configured to:
send to the wireless communication device an indication, an identifier associated with system configuration included in an access information database, and
send to the wireless communication device an indication, the indication indicating to a wireless communication device whether an access attempt to the network node is allowed using a parameter of a system configuration present in the wireless communication device with a validity of the system configuration being undetermined and whether the access attempt to the communication network is allowed using the parameter of the system configuration with a validity of the identifier being undetermined.

15. A communication system comprising the network node of claim 14, and further comprising a wireless communication device, the wireless communication device comprising:

radio interface circuitry; and processing circuitry operatively coupled to the radio interface circuitry and configured to:

receive a parameter of a system configuration for accessing a wireless communication network, via the radio interface circuitry;

the system configuration being included in an access information database and associated with an identifier, to receive the identifier from the wireless communication network, receive an indication from the wireless communication network, via the radio interface circuitry, the indication indicating whether an access attempt to the wireless communication network is allowed using the parameter of the system configuration with a validity of the system configuration being undetermined and whether the access attempt to the communication network is allowed using the parameter of the system configuration with a validity of the identifier being undetermined; and perform an access attempt to the wireless communication network, using the radio interface circuitry, if the indication indicates that an access attempt to the wireless communication network is allowed using the parameter of the system configuration with a validity of the system configuration being undetermined.

* * * * *